(12) United States Patent
Terao

(10) Patent No.: US 7,269,291 B2
(45) Date of Patent: Sep. 11, 2007

(54) METHOD AND APPARATUS FOR HIGH SPEED DATA COMPRESSION AND DECOMPRESSION

(75) Inventor: Noriyuki Terao, Sendai (JP)

(73) Assignee: Ricoh Co. Ltd., Tokyo (JP)

(*) Notice: Subject to any disclaimer, the term of this patent is extended or adjusted under 35 U.S.C. 154(b) by 88 days.

(21) Appl. No.: 10/856,778

(22) Filed: Jun. 1, 2004

(65) Prior Publication Data

US 2004/0218826 A1    Nov. 4, 2004

Related U.S. Application Data

(63) Continuation of application No. 09/549,511, filed on Apr. 14, 2000.

(30) Foreign Application Priority Data

Apr. 15, 1999 (JP) .................................. 11-107722
May 6, 1999 (JP) .................................. 11-125623

(51) Int. Cl.
*G06K 9/36* (2006.01)
(52) U.S. Cl. ...................................... 382/240; 382/232
(58) Field of Classification Search ................ 382/240, 382/232, 260; 358/426.02; 711/200; 375/240.11; 369/275.3
See application file for complete search history.

(56) References Cited

U.S. PATENT DOCUMENTS

| 5,381,354 | A | | 1/1995 | Soloff ........................... 708/301 |
|---|---|---|---|---|
| 5,745,392 | A | | 4/1998 | Ergas et al. ................. 708/203 |
| 5,777,678 | A | * | 7/1998 | Ogata et al. ............ 375/240.11 |
| 5,917,948 | A | * | 6/1999 | Holtz ........................... 382/232 |
| 5,983,251 | A | * | 11/1999 | Martens et al. .............. 708/203 |
| 6,101,284 | A | * | 8/2000 | Matsubara et al. .......... 382/260 |
| 6,134,202 | A | * | 10/2000 | Tsutsui ..................... 369/275.3 |
| 6,381,280 | B1 | | 4/2002 | Lynch et al. ............ 375/240.19 |
| 6,658,379 | B1 | * | 12/2003 | Ogata .......................... 704/203 |

FOREIGN PATENT DOCUMENTS

JP          401228375 A  *  9/1989

(Continued)

OTHER PUBLICATIONS

Singh et al., "Hardware Implementation of a Wavelet Based Image Compression Coder," IEEE Symposium on Advances in Digital Filtering and Signal Processing, Jun. 1998, pp. 169-173.

(Continued)

*Primary Examiner*—Anh Hong Do
(74) *Attorney, Agent, or Firm*—Oblon, Spivak, McClelland, Maier & Neustadt, P.C.

(57) ABSTRACT

A subband processing apparatus useful for wavelet conversion and compression-decompression operations includes a plurality of memories and a plurality of analytic filter banks. The plurality of memories store an input signal in a way such that the input signal is divided into a plurality of regional signals to correspond to the plurality of memories. The plurality of analytic filter banks analyzes in parallel the regional signals. Each analytic filter bank is configured to be in a one-to-one relationship with one of the plurality of memories. In this apparatus, each of the plurality of memories stores a corresponding regional signal and at least one other signal copied from the leading and trailing portions of other stored regional signals. Reverse processing is provided to synthesize a signal from a plurality of analyzed subband signals.

8 Claims, 23 Drawing Sheets

FOREIGN PATENT DOCUMENTS

| JP | 08-139935 | 5/1996 |
|----|-----------|--------|
| JP | 09-027752 | 1/1997 |
| JP | 10-224788 | 8/1998 |
| JP | 11-112985 | 4/1999 |

OTHER PUBLICATIONS

"Embedded Image Coding Using Zerotrees of Wavelet Coefficients," IEEE transactions on signal processing, vol. 41 No. 12, Dec. 1993, Jerome M. Shapiro.

"Image Compression via Joint Statistical Characterization in the Wavelet Domain," GRASP Laboratory Technical Report #414, University of Pennsylvania, May 30, 1997, Robert W. Buccigrossi and Eero P. Simoncelli.

"Compression and Segmentation of Images Using an Inter-Subband Wavelet Probablity Model," Robert W. Buccigrossi, A Dissertation in Computer and Information Science.

Jongwoo Bae, et al., "A Fast and Area-Efficient VLSI Architecture for Embedded Image Coding", Proceedings International Conference Image Processing, IEEE, vol. 3, Oct. 23, 1995, pp. 452-455.

* cited by examiner

Fig. 2

| Label | Contents |
|---|---|
| 01 | x0(1), x0(0) |
| 02 | x0(0), x0(1), x0(2), x0(3), ..., x0(14), x0(15) |
| 03 | x1(0), x1(1) |
| 11 | x0(14), x0(15) |
| 12 | x1(0), x1(1), x1(2), x1(3), ..., x1(14), x1(15) |
| 13 | x2(0), x2(1) |
| 21 | x1(14), x1(15) |
| 22 | x2(0), x2(1), x2(2), x2(3), ..., x2(14), x2(15) |
| 23 | x3(0), x3(1) |
| 31 | x2(14), x2(15) |
| 32 | x3(0), x3(1), x3(2), x3(3), ..., x3(14), x3(15) |
| 33 | x3(15), x3(14) |

Fig. 7

| | |
|---|---|
| 00,01,02,03,04,05,06,07<br>10,11,12,13,14,15,16,17<br>20,21,22,23,24,25,26,27<br>30,31,32,33,34,35,36,37<br>40,41,42,43,44,45,46,47<br>50,51,52,53,54,55,56,57<br>60,61,62,63,64,65,66,67<br>70,71,72,73,74,75,76,77 | 08,09,0a,0b,0c,0d,0e,0f<br>18,19,1a,1b,1c,1d,1e,1f<br>28,29,2a,2b,2c,2d,2e,2f<br>38,39,3a,3b,3c,3d,3e,3f<br>48,49,4a,4b,4c,4d,4e,4f<br>58,59,5a,5b,5c,5d,5e,5f<br>68,69,6a,6b,6c,6d,6e,6f<br>78,79,7a,7b,7c,7d,7e,7f |
| 80,81,82,83,84,85,86,87<br>90,91,92,93,94,95,96,97<br>a0,a1,a2,a3,a4,a5,a6,a7<br>b0,b1,b2,b3,b4,b5,b6,b7<br>c0,c1,c2,c3,c4,c5,c6,c7<br>d0,d1,d2,d3,d4,d5,d6,d7<br>e0,e1,e2,e3,e4,e5,e6,e7<br>f0,f1,f2,f3,f4,f5,f6,f7 | 88,89,8a,8b,8c,8d,8e,8f<br>98,99,9a,9b,9c,9d,9e,9f<br>a8,a9,aa,ab,ac,ad,ae,af<br>b8,b9,ba,bb,bc,bd,be,bf<br>c8,c9,ca,cb,cc,cd,ce,cf<br>d8,d9,da,db,dc,dd,de,df<br>e8,e9,ea,eb,ec,ed,ee,ef<br>f8,f9,fa,fb,fc,fd,fe,ff |

Fig. 8

| 211 | 210 | 212 | | 221 | 220 | 222 |
|---|---|---|---|---|---|---|
| 01,00 | 00,01,02,03,04,05,06,07 | 08,09 | | 06,07 | 08,09,0a,0b,0c,0d,0e,0f | 0f,0e |
| 11,10 | 10,11,12,13,14,15,16,17 | 18,19 | | 16,17 | 18,19,1a,1b,1c,1d,1e,1f | 1f,1e |
| 21,20 | 20,21,22,23,24,25,26,27 | 28,29 | | 26,27 | 28,29,2a,2b,2c,2d,2e,2f | 2f,2e |
| 31,30 | 30,31,32,33,34,35,36,37 | 38,39 | | 36,37 | 38,39,3a,3b,3c,3d,3e,3f | 3f,3e |
| 41,40 | 40,41,42,43,44,45,46,47 | 48,49 | | 46,47 | 48,49,4a,4b,4c,4d,4e,4f | 4f,4e |
| 51,50 | 50,51,52,53,54,55,56,57 | 58,59 | | 56,57 | 58,59,5a,5b,5c,5d,5e,5f | 5f,5e |
| 61,60 | 60,61,62,63,64,65,66,67 | 68,69 | | 66,67 | 68,69,6a,6b,6c,6d,6e,6f | 6f,6e |
| 71,70 | 70,71,72,73,74,75,76,77 | 78,79 | | 76,77 | 78,79,7a,7b,7c,7d,7e,7f | 7f,7e |
| 81,80 | 80,81,82,83,84,85,86,87 | 88,89 | | 86,87 | 88,89,8a,8b,8c,8d,8e,8f | 8f,8e |
| 91,90 | 90,91,92,93,94,95,96,97 | 98,99 | | 96,97 | 98,99,9a,9b,9c,9d,9e,9f | 9f,9e |
| a1,a0 | a0,a1,a2,a3,a4,a5,a6,a7 | a8,a9 | | a6,a7 | a8,a9,aa,ab,ac,ad,ae,af | af,ae |
| b1,b0 | b0,b1,b2,b3,b4,b5,b6,b7 | b8,b9 | | b6,b7 | b8,b9,ba,bb,bc,bd,be,bf | bf,be |
| c1,c0 | c0,c1,c2,c3,c4,c5,c6,c7 | c8,c9 | | c6,c7 | c8,c9,ca,cb,cc,cd,ce,cf | cf,ce |
| d1,d0 | d0,d1,d2,d3,d4,d5,d6,d7 | d8,d9 | | d6,d7 | d8,d9,da,db,dc,dd,de,df | df,de |
| e1,e0 | e0,e1,e2,e3,e4,e5,e6,e7 | e8,e9 | | e6,e7 | e8,e9,ea,eb,ec,ed,ee,ef | ef,ee |
| f1,f0 | f0,f1,f2,f3,f4,f5,f6,f7 | f8,f9 | | f6,f7 | f8,f9,fa,fb,fc,fd,fe,ff | ff,fe |
| 231 | 230 | 232 | | 241 | 240 | 242 |

Fig. 9

| | | | |
|---|---|---|---|
| L00,L01,L02,L03,H00,H01,H02,H03 | L04,L05,L06,L07,H04,H05,H06,H07 | L80,L81,L82,L83,H80,H81,H82,H83 | L84,L85,L86,L87,H84,H85,H86,H87 |
| L10,L11,L12,L13,H10,H11,H12,H13 | L14,L15,L16,L17,H14,H15,H16,H17 | L90,L91,L92,L93,H90,H91,H92,H93 | L94,L95,L96,L97,H94,H95,H96,H97 |
| L20,L21,L22,L23,H20,H21,H22,H23 | L24,L25,L26,L27,H24,H25,H26,H27 | La0,La1,La2,La3,Ha0,Ha1,Ha2,Ha3 | La4,La5,La6,La7,Ha4,Ha5,Ha6,Ha7 |
| L30,L31,L32,L33,H30,H31,H32,H33 | L34,L35,L36,L37,H34,H35,H36,H37 | Lb0,Lb1,Lb2,Lb3,Hb0,Hb1,Hb2,Hb3 | Lb4,Lb5,Lb6,Lb7,Hb4,Hb5,Hb6,Hb7 |
| L40,L41,L42,L43,H40,H41,H42,H43 | L44,L45,L46,L47,H44,H45,H46,H47 | Lc0,Lc1,Lc2,Lc3,Hc0,Hc1,Hc2,Hc3 | Lc4,Lc5,Lc6,Lc7,Hc4,Hc5,Hc6,Hc7 |
| L50,L51,L52,L53,H50,H51,H52,H53 | L54,L55,L56,L57,H54,H55,H56,H57 | Ld0,Ld1,Ld2,Ld3,Hd0,Hd1,Hd2,Hd3 | Ld4,Ld5,Ld6,Ld7,Hd4,Hd5,Hd6,Hd7 |
| L60,L61,L62,L63,H60,H61,H62,H63 | L64,L65,L66,L67,H64,H65,H66,H67 | Le0,Le1,Le2,Le3,He0,He1,He2,He3 | Le4,Le5,Le6,Le7,He4,He5,He6,He7 |
| L70,L71,L72,L73,H70,H71,H72,H73 | L74,L75,L76,L77,H74,H75,H76,H77 | Lf0,Lf1,Lf2,Lf3,Hf0,Hf1,Hf2,Hf3 | Lf4,Lf5,Lf6,Lf7,Hf4,Hf5,Hf6,Hf7 |

Fig. 10

| 311 | 310 | 312 | 331 | 330 | 332 |
|---|---|---|---|---|---|
| L10,L11,L12,L13<br>L00,L01,L02,L03<br>H10,H11,H12,H13<br>H00,H01,H02,H03 | L00,L01,L02,L03<br>L10,L11,L12,L13<br>L20,L21,L22,L23<br>L30,L31,L32,L33<br>L40,L41,L42,L43<br>L50,L51,L52,L53<br>L60,L61,L62,L63<br>L70,L71,L72,L73<br>H00,H01,H02,H03<br>H10,H11,H12,H13<br>H20,H21,H22,H23<br>H30,H31,H32,H33<br>H40,H41,H42,H43<br>H50,H51,H52,H53<br>H60,H61,H62,H63<br>H70,H71,H72,H73 | L80,L81,L82,L83<br>L90,L91,L92,L93<br>H80,H81,H82,H83<br>H90,H91,H92,H93 | L60,L61,L62,L63<br>L70,L71,L72,L73<br>H60,H61,H62,H63<br>H70,H71,H72,H73 | L80,L81,L82,L83<br>L90,L91,L92,L93<br>La0,La1,La2,La3<br>Lb0,Lb1,Lb2,Lb3<br>Lc0,Lc1,Lc2,Lc3<br>Ld0,Ld1,Ld2,Ld3<br>Le0,Le1,Le2,Le3<br>Lf0,Lf1,Lf2,Lf3<br>H80,H81,H82,H83<br>H90,H91,H92,H93<br>Ha0,Ha1,Ha2,Ha3<br>Hb0,Hb1,Hb2,Hb3<br>Hc0,Hc1,Hc2,Hc3<br>Hd0,Hd1,Hd2,Hd3<br>He0,He1,He2,He3<br>Hf0,Hf1,Hf2,Hf3 | Lf0,Lf1,Lf2,Lf3<br>Le0,Le1,Le2,Le3<br>Hf0,Hf1,Hf2,Hf3<br>He0,He1,He2,He3 |

| 321 | 320 | 322 | 341 | 340 | 342 |
|---|---|---|---|---|---|
| L14,L15,L16,L17<br>L04,L05,L06,L07<br>H14,H15,H16,H17<br>H04,H05,H06,H07 | L04,L05,L06,L07<br>L14,L15,L16,L17<br>L24,L25,L26,L27<br>L34,L35,L36,L37<br>L44,L45,L46,L47<br>L54,L55,L56,L57<br>L64,L65,L66,L67<br>L74,L75,L76,L77<br>H04,H05,H06,H07<br>H14,H15,H16,H17<br>H24,H25,H26,H27<br>H34,H35,H36,H37<br>H44,H45,H46,H47<br>H54,H55,H56,H57<br>H64,H65,H66,H67<br>H74,H75,H76,H77 | L84,L85,L86,L87<br>L94,L95,L96,L97<br>H84,H85,H86,H87<br>H94,H95,H96,H97 | L64,L65,L66,L67<br>L74,L75,L76,L77<br>H64,H65,H66,H67<br>H74,H75,H76,H77 | L84,L85,L86,L87<br>L94,L95,L96,L97<br>La4,La5,La6,La7<br>Lb4,Lb5,Lb6,Lb7<br>Lc4,Lc5,Lc6,Lc7<br>Ld4,Ld5,Ld6,Ld7<br>Le4,Le5,Le6,Le7<br>Lf4,Lf5,Lf6,Lf7<br>H84,H85,H86,H87<br>H94,H95,H96,H97<br>Ha4,Ha5,Ha6,Ha7<br>Hb4,Hb5,Hb6,Hb7<br>Hc4,Hc5,Hc6,Hc7<br>Hd4,Hd5,Hd6,Hd7<br>He4,He5,He6,He7<br>Hf4,Hf5,Hf6,Hf7 | Lf4,Lf5,Lf6,Lf7<br>Le4,Le5,Le6,Le7<br>Hf4,Hf5,Hf6,Hf7<br>He4,He5,He6,He7 |

Fig. 11

| | | | | | | | |
|---|---|---|---|---|---|---|---|
| LL00,LL01,LL02,LL03,HL00,HL01,HL02,HL03 | | | | LL04,LL05,LL06,LL07,HL04,HL05,HL06,HL07 | | | |
| LL10,LL11,LL12,LL13,HL10,HL11,HL12,HL13 | | | | LL14,LL15,LL16,LL17,HL14,HL15,HL16,HL17 | | | |
| LL20,LL21,LL22,LL23,HL20,HL21,HL22,HL23 | | | | LL24,LL25,LL26,LL27,HL24,HL25,HL26,HL27 | | | |
| LL30,LL31,LL32,LL33,HL30,HL31,HL32,HL33 | | | | LL34,LL35,LL36,LL37,HL34,HL35,HL36,HL37 | | | |
| LH00,LH01,LH02,LH03,HH00,HH01,HH02,HH03 | | | | LH04,LH05,LH06,LH07,HH04,HH05,HH06,HH07 | | | |
| LH10,LH11,LH12,LH13,HH10,HH11,HH12,HH13 | | | | LH14,LH15,LH16,LH17,HH14,HH15,HH16,HH17 | | | |
| LH20,LH21,LH22,LH23,HH20,HH21,HH22,HH23 | | | | LH24,LH25,LH26,LH27,HH24,HH25,HH26,HH27 | | | |
| LH30,LH31,LH32,LH33,HH30,HH31,HH32,HH33 | | | | LH34,LH35,LH36,LH37,HH34,HH35,HH36,HH37 | | | |
| LL40,LL41,LL42,LL43,HL40,HL41,HL42,HL43 | | | | LL44,LL45,LL46,LL47,HL44,HL45,HL46,HL47 | | | |
| LL50,LL51,LL52,LL53,HL50,HL51,HL52,HL53 | | | | LL54,LL55,LL56,LL57,HL54,HL55,HL56,HL57 | | | |
| LL60,LL61,LL62,LL63,HL60,HL61,HL62,HL63 | | | | LL64,LL65,LL66,LL67,HL64,HL65,HL66,HL67 | | | |
| LL70,LL71,LL72,LL73,HL70,HL71,HL72,HL73 | | | | LL74,LL75,LL76,LL77,HL74,HL75,HL76,HL77 | | | |
| LH40,LH41,LH42,LH43,HH40,HH41,HH42,HH43 | | | | LH44,LH45,LH46,LH47,HH44,HH45,HH46,HH47 | | | |
| LH50,LH51,LH52,LH53,HH50,HH51,HH52,HH53 | | | | LH54,LH55,LH56,LH57,HH54,HH55,HH56,HH57 | | | |
| LH60,LH61,LH62,LH63,HH60,HH61,HH62,HH63 | | | | LH64,LH65,LH66,LH67,HH64,HH65,HH66,HH67 | | | |
| LH70,LH71,LH72,LH73,HH70,HH71,HH72,HH73 | | | | LH74,LH75,LH76,LH77,HH74,HH75,HH76,HH77 | | | |

Fig. 21

| A | A | B |
|---|---|---|
| A | A | B |

Fig. 22

| A | A | B |
|---|---|---|
| A | A | B |
| C | C | D |

METHOD AND APPARATUS FOR HIGH SPEED DATA COMPRESSION AND DECOMPRESSION

CROSS-REFERENCE TO RELATED APPLICATIONS

This application is a Continuation of application Ser. No. 09/549.511 filed on Apr. 14, 2000.

This application claims priority under 35 U.S.C. §119 to Japanese patent application Nos. JPAP11-107722 filed on Apr. 15, 1999 and JPAP11-125623 filed on May 6, 1999, the entire contents of which are hereby incorporated by reference.

BACKGROUND OF THE INVENTION

1. Field of the Invention

The present invention generally relates to a method and apparatus for data compression and decompression, and more particularly to a method and apparatus for compression and decompression which improves operation speed by employing parallel signal processing in an efficient manner.

2. Discussion of the Background

A variety of data compression apparatuses have been developed for use in the computer area. As an example, FIG. 24 shows a typical wavelet conversion apparatus which includes a wavelet converter 800 and an encoder 801. The wavelet converter 800 is configured to perform a two-layered wavelet conversion, and includes analytic subband filter banks 802-807. Each of the filter banks 802-807 includes a low pass filter (LPF) and a high pass filter (HPF) and two two-times downsamplers, indicated by ↓2 in FIG. 24.

In FIG. 24, an input image signal is horizontally subband-analyzed by the filter bank 802 and the resultant low and high pass coefficients are vertically subband-analyzed by the filter banks 804 and 803, respectively. The analysis made by the filter banks 802-804 is referred to as the first layer analysis. Then, the low pass coefficient output from the filter bank 804 is horizontally subband-analyzed by the filter bank 805 and the resultant low and high pass coefficients are vertically subband-analyzed by the filter banks 807 and 806, respectively. In this way, the wavelet converter 800 outputs wavelet conversion coefficients 1LH, 1HL, 1HH, 2LL, 2LH, 2HL, and 2HH in the seven subbands analyzed, as shown in FIG. 25. These wavelet conversion coefficients are input to the encoder 801, and the encoder 801 outputs a coded signal.

FIG. 26 shows a typical wavelet reverse conversion apparatus for reconstructing an original image by performing a reverse conversion based on an input coded signal. The input coded signal is generated in the above-mentioned way, for example. This wavelet reverse conversion apparatus of FIG. 26 includes a decoder 851 and a wavelet reverse converter 850. The decoder 851 decodes the input coded signal and outputs two-layered wavelet conversion coefficients 1LH, 1HL, 1HH, 2LL, 2LH, 2HL, and 2HH. The wavelet reverse converter 850 is configured to perform a two-layer reverse wavelet conversion, and includes synthetic subband filter banks 852-857. Each of the filter banks 852-857 includes a low pass filter (LPF) and a high pass filter (HPF) and two two-times upsamplers, indicated by ↑2 in FIG. 26.

The output two-layered wavelet conversion coefficients 2LL, 2LH, 2HL, and 2HH are vertically subband-synthesized by the filter banks 857 and 856, and the resultant synthesized coefficients are horizontally subband-synthesized by the filter bank 855. Then, the coefficient output from the filter bank 855 and the coefficient 1LH are vertically subband-synthesized by the filter bank 854, and the coefficients 1HL and 1HH are vertically subband-synthesized by the filter banks 853. After that, the coefficients output from the filter banks 854 and 853 are horizontally subband-synthesized by the filter bank 852 and the resultant output from the filter bank 852 is, accordingly, the original image signal. In this way, the wavelet reverse converter 850 outputs the original image signal.

The technology of the above-described data compression apparatus is described in "Introduction to Wavelet," C. K. Chui, Academic Press, New York, 1992. Also, the above-mentioned type of data compression apparatus is described in U.S. Pat. No. 5,748,786, issued May 5, 1998 to Ahmad-Zandi, et al.

SUMMARY OF THE INVENTION

Applicant has determined that the data conversion described above can be improved by the application of parallel processing. For example, a data compression apparatus can analyze a two-dimension signal (i.e., an image signal) and separate it into a plurality of subbands and then perform parallel wavelet conversion and encoding operations relative to the plurality of subbands.

However, such parallel operations with a discrete cosine transform (DCT) result in generating block noise at boundaries of subbands. Accordingly, the data encoding apparatus may impair the advantage of using the wavelet conversion relative to DCT.

In addition, a data compression apparatus typically performs parallel processing in which a one-dimension input signal is divided into a plurality of blocks and these signals are input to analytic subband filter banks for performing parallel subband-analysis. In this case, the parallel processing is aimed to efficiently increase the speed of a data compression operation.

During this parallel processing, the divided signals in the plurality of blocks need to be temporarily stored in a memory in such a manner that each of the signals can be independently accessible. However, in particular when the analytic subband filter banks use three or more taps, storing each of the divided signals in an independently accessible memory causes a problem. The problem is that extra memory access operations as well as extra memory access controls are required during the processing of the first and last blocks and also boundaries between blocks, which details will be explained later. This problem interferes with the desired increase of processing speed and requires a complex configuration to avoid it.

The above-mentioned U.S. Pat. No. 5,748,786 describes a TS (two-six) transform which uses two taps for the low pass filter and six taps for the high pass filter and is one exemplary case in which the above-mentioned problem can occur.

In order to overcome such problems, the present invention provides a subband forming apparatus that includes a plurality of memory locations and a plurality of analytic filter banks. The plurality of memory locations store an input signal in such a way that the input signal is divided into a plurality of regional signals and each of the plurality of memory locations store corresponding ones of these regional signals. The plurality of analytic filter banks each process the input regional signal received from a corresponding one of the plurality of memory locations in a parallel manner. Each analytic filter bank is, thus, in a one-to-one relationship with one of the plurality of memory locations. Further, each analytic filter bank accesses the corresponding memory location out of the plurality of memory locations to retrieve a corresponding regional signal and divides the accessed regional signal from the corresponding memory location into a plurality of subbands. In this apparatus, each of the plurality of memory locations stores not only the segment of divided input data it receives as the corresponding regional signal but also signal data copied from at least one of the leading and trailing portions of regional signals stored in other memory locations which were divided from the same input signal.

At least one of the plurality of memory locations storing regional signals divided from the same input signal can also store at least one of reverse-mirrored signals copied from leading and trailing portions of the stored region signal.

Also, the present invention provides a wavelet conversion apparatus which includes at least two of the above-described subband coding apparatuses for executing data conversion operations in horizontal and vertical directions.

Also, the present invention provides a subband synthesizing apparatus which includes a plurality of memory locations and a plurality of synthesizing filter banks. The plurality of memory locations stores an input subband-analyzed signal in a way such that the input subband-analyzed signal is divided into a plurality of subband regional signals. The plurality of synthetic filter banks synthesizes in parallel the input subband regional signals. Each synthesizing filter bank is configured to be in a one-to-one relationship with one of the plurality of memory locations and to access the one-to-one corresponding memory location to reconstruct the regional signal corresponding to the subband regional signal. In this apparatus, each of the plurality of memory locations also store at least one of a signal copied from the leading and trailing portions of regional subband signals that are stored in other memory locations.

At least one of the plurality of memory locations corresponding to a specific additionally stores at least one of reverse-mirrored signals copied from the leading and trailing portions of the stored signal of the specific subband regional signal.

Also, the present invention provides a wavelet reverse conversion apparatus which includes at least two of the above-described subband decoding apparatuses for executing data conversion operations in horizontal and vertical directions.

Also, the present invention provides a data compression apparatus which includes the above-described wavelet conversion apparatus for executing the wavelet conversion relative to a two-dimension signal and the above-described subband coding apparatus for executing the coding operation relative to a wavelet conversion coefficient signal output from the wavelet conversion apparatus.

Also, the present invention provides a data compression apparatus which includes a plurality of the above-described wavelet conversion apparatuses for executing in parallel wavelet conversion relative to a two-dimension signal divided into a plurality of regions to correspond to the plurality of the wavelet conversion apparatuses and a plurality of the above-described subband coding apparatuses, corresponding to the plurality of the wavelet conversion apparatuses, for executing in parallel coding operations relative to a plurality of wavelet conversion coefficient signals respectively output from the plurality of wavelet conversion apparatuses.

Also, the present invention provides a data decompression apparatus which includes the above-described subband decoding apparatus for executing the decoding operation relative to a compression-encoded signal made based on a two-dimension signal and the above-described wavelet reverse conversion apparatus for executing the wavelet reverse conversion relative to a wavelet conversion coefficient signal output from the subband decoding apparatus to reconstruct the two-dimension signal.

Also, the present invention provides a data decompression apparatus which includes a plurality of the above-described subband decoding apparatuses and a plurality of the above-described wavelet reverse conversion apparatuses corresponding to the plurality of the subband decoding apparatuses. Each of the plurality of the subband decoding apparatuses executes in parallel the decoding operations relative to a plurality of compression-encoded signals correspondingly divided in a plurality of regions made based on a two-dimension signal. Each of the plurality of the wavelet reverse conversion apparatuses executes in parallel the wavelet reverse conversion relative to a plurality of wavelet conversion coefficient signals respectively output from the plurality of wavelet reverse conversion apparatuses to reconstruct the two-dimension signal.

Also, the present invention provides a subband coding method which includes the steps of separating, storing, and performing. The separating step separates an input signal into a plurality of segments. The storing step stores the signal separately in regions of plural memories in accordance with the plurality of segments. The performing in parallel step includes parallel subband analytic operations relative to the signal separated into the plurality of segments and stored in the plural regions. In this method, the storing step stores, in addition to the stored signal, signals copied from leading and trailing portions of signal segments in immediately adjacent regions so that each stored region includes a particular signal segment and the copied signals.

Also, the present invention provides a subband decoding method which includes the steps of storing and performing parallel operations. The storing step stores an input subband-analyzed signal separately in a plurality of regions. The performing parallel operations step performs subband synthetic operations in parallel relative to the input subband-analyzed signal divided in the plurality of regions. In this method, the storing step stores, in addition to the stored signal of each region of the plurality of regions, signals copied from leading and trailing portions of signals in immediately adjacent regions.

Also, the present invention provides a data coding apparatus which includes a wavelet converter, a region divider, and a plurality of coders. The wavelet converter converts a two-dimension signal with a wavelet conversion and outputting wavelet coefficients. The region divider performs a regional division in which the wavelet conversion coefficients are divided in a plurality of coefficient groups in accordance with conditions such that coefficients existing in a spatial location are sorted in a group. The plurality of coders code in parallel the wavelet conversion coefficients divided into the plurality of coefficient groups.

The plurality of coders may respectively add information of the spatial location relative to each output coded signal.

Also, the present invention provides a data decoding apparatus which includes a plurality of decoders, a region synthesizer, and a wavelet reverse converter. The plurality of decoders perform in parallel decoding operations relative to coded signals separated in a plurality of coefficient groups. In this case, the coded signals are generated through a regional division in which wavelet conversion coefficients of a two-dimension signal are divided in a plurality of coefficient groups in accordance with conditions such that coefficients existing in a spatial location are sorted in a group and in which the wavelet conversion coefficients divided into the plurality of coefficient groups are respectively coded. The region synthesizer performs a region synthesizing operation, corresponding to the regional division, in which the wavelet conversion coefficients in the plurality of coefficient groups are synthesized. The region synthesizer outputs a set of resultant wavelet conversion coefficients. The wavelet reverse converter performs a wavelet reverse conversion relative to the set of the resultant wavelet conversion coefficients.

The coded signals in a plurality of coefficient groups input to the plurality of decoders may contain information of spatial locations relative to the wavelet conversion coefficients divided into the respective regions, and the region synthesizer may use the information of spatial locations during the region synthesizing operation.

Also, the present invention provides a data coding method which includes the steps of converting, outputting, performing, and coding. The converting step converts a two-dimension signal with a wavelet conversion. The outputting step outputs wavelet coefficients. The performing step performs a regional division in which the wavelet conversion coefficients are divided into a plurality of coefficient groups in accordance with conditions such that coefficients existing in a spatial location are sorted in a group. The coding step codes in parallel the wavelet conversion coefficients divided in the plurality of coefficient groups.

Also, the present invention provides a data decoding method which includes the steps of performing, executing, outputting, and carrying out. The performing step performs in parallel decoding operations relative to coded signals separated into a plurality of coefficient groups. In this case, the coded signals are generated through a regional division in which wavelet conversion coefficients of a two-dimension signal are divided in a plurality of coefficient groups in accordance with conditions such that coefficients existing in a spatial location are sorted in a group and in which the wavelet conversion coefficients divided into the plurality of coefficient groups are respectively coded. The executing step executes a region synthesizing operation, corresponding to the regional division, in which the wavelet conversion coefficients in the plurality of coefficient groups are synthesized. The outputting step outputs a set of wavelet conversion coefficients. The carrying-out step carries out a wavelet reverse conversion relative to the set of wavelet conversion coefficients.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is an illustration for explaining the divided input signal segments and a block configuration of each regional signal stored in a corresponding memory location in the subband coding apparatus of FIG. 1;

FIG. 7 is an illustration showing a two-dimension input signal (i.e., an image signal) having 16 by 16 samples provided to the wavelet conversion apparatus of FIG. 6;

FIG. 8 is an illustration showing a way of applying the block configuration to the two-dimension input signal of FIG. 7 in the wavelet conversion apparatus of FIG. 6;

FIG. 9 is an illustration showing coefficient signals to be generated by a parallel horizontal subband division operation;

FIG. 10 is an illustration showing a way of applying the block configuration to the coefficient signals of FIG. 9;

FIG. 11 is an illustration showing coefficient signals to be generated by a parallel vertical subband division operation;

FIGS. 21 and 22 are illustrations for explaining manners of region analytic operations performed by the wavelet conversion apparatus of FIG. 18 when irregular regions are included;

DESCRIPTION OF THE PREFERRED EMBODIMENTS

Figure 1:
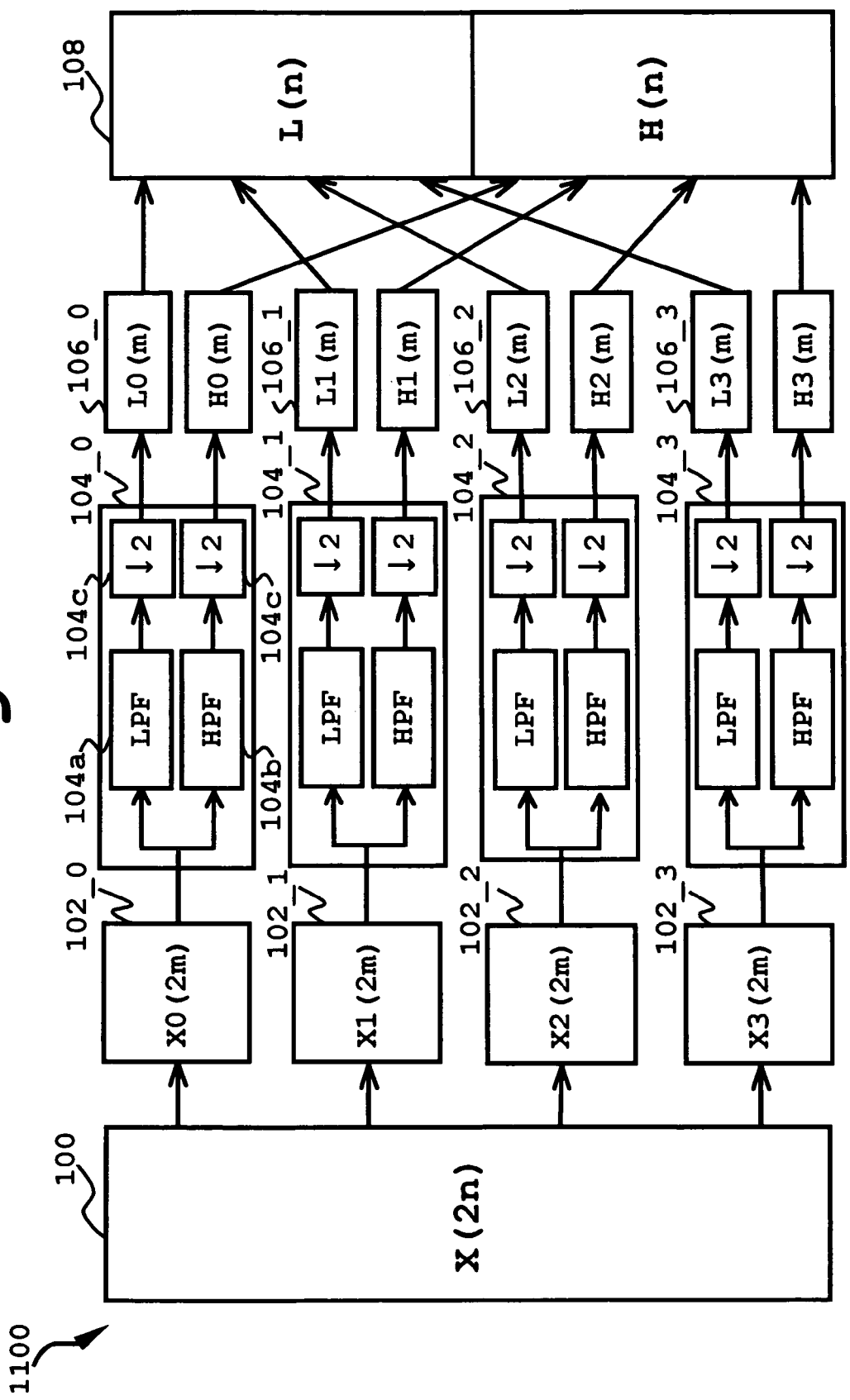
FIG. 1 is a block diagram of a subband forming apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram of a subband forming apparatus 1100 according to an exemplary embodiment of the present invention. The subband forming apparatus 1100 of FIG. 1 performs a two-subband forming operation by first dividing a single-dimension signal x($2n$)

into four regional signals and then processing the four regional signals in parallel. The subband forming apparatus 1100 includes a signal source 100, memories 102_0-102_3, filter banks 104_0-104_3, memories 106_0-106_3, and a memory 108. In FIG. 1, each of signal source 100 and the memories 102_0-102_3, 106_0-106_3, and 108 is labeled with the corresponding signal name (i.e., the memory 102_0 is labeled with X0(2m)), for the sake of convenience. Further, in FIG. 1, each of the memories 106_0-106_3 and 108 is particularly divided into two sections which are labeled with the corresponding signal names (i.e., the memory 106_0 is labeled with L0(m) and H0(m)).

The signal source 100 generates a source signal, i.e., a single-dimension signal x(2n), and divides it into four regional signals, which are referred to as X0(2m), X1(2m), X2(2m), and X3(2m). For this, the signal source 100 may include a memory to store the signal X(2n). The memories 102_0-102_3 access the signal source 100 on an independent basis from one another so as to receive and store the four regional signals X0(2m)-X3(2m), respectively. The filter banks 104_0-104_3 are of an analysis type and access the memories 102_0-102_3, respectively, on an independent basis from one another to analyze the corresponding signals such that each of the signals is divided into low and high frequency signals, that is, two subbands.

For example, the filter bank 104_0 receives X0(2m) from the memory 102_0, and then divides it into low and high frequency signals. Thus, the filter banks 104_0-104_3 output the low frequency signals and the high frequency signals. The low frequency signals are referred to as low subband passing coefficient signals L0(m)-L3(m) and the high frequency signals are referred to as high subband passing coefficient signals H0(m)-H3(m). These output signals are temporarily stored in the memories 106_0-106_3. More specifically, the memory 106_0 stores L0(m) and H0(m), the memory 106_1 stores L1(m) and H1(m), the memory 106_2 stores L2(m) and H2(m), and the memory 106_3 stores L3(m) and H3(m).

In this way, four sets of the low and high subband passing coefficient signals different from one another are generated from one source signal. After that, as shown in FIG. 1, L0(m)-L3(m) and H0(m)-H3(m) are respectively gathered and input into the memory 108. In the memory 108, a signal region of L0(m)-L3(m) is referred to as L(n) and a signal region of H0(m)-H3(m) is referred to as H(n), as shown in FIG. 1. However, this process with the memory 108 may not necessarily be required.

In general, a filter bank for use in the subband analysis includes subband analysis filters for dividing an input signal into a plurality of subband signals and downsamplers for downsampling the divided signals in accordance with the subbands. In this embodiment, performing the four parallel two-subband coding operation, each of the four filter banks for use in the two-subband analysis has the same general configuration and includes a pair of low and high pass filters and two downsamplers, one for the low pass filter and the other for the high pass filter, each for sampling every other unit of the signal data. For example, the filter bank 104-0 includes a low pass filter (LPF) 104a, a high pass filter (HPF) 104b, and two downsamplers 104c. The downsamplers 104c are indicated with a symbol $\downarrow 2$, as shown in FIG. 1.

In this embodiment, the one-dimensional source signal X(n) includes 64 samples, for example. Accordingly, the signal X(n) is divided into four regional signals each covering 16 samples. In addition, each of the filter banks employed by this embodiment uses a two-tap low pass filter (LPF) and a six-tap high pass filter (HPF). An operation of a filter bank using such a two-tap low pass filter and a six-tap high pass filter is particularly referred to as the TS (two-and-six) conversion. Details of the operation of such TS conversion is described, for example, in U.S. Pat. No. 5,748,786 issued May 5, 1998 to Ahmad Zandi, et al. Based on this configuration, the regional signals, as shown in FIG. 2, are transmitted to and stored in the memories 102_0-102_3.

As shown in FIG. 2, the memory 102_0 is configured to store blocks 01, 02, and 03. In a similar manner, the memory 102_1 stores blocks 11, 12, and 13, the memory 102_2 stores blocks 21, 22, and 23, and the memory 102_3 stores blocks 31, 32, and 33. In the memory 102_0, the block 01 represents a reversed mirror signal relative to the beginning of the block 02. The block 02 includes 16 samples of X0(2m) including X0(0)-X0(15). The block 03 represents a copy signal relative to the beginning of the block 12.

Similarly, in the memory 102_1, the block 11 represents a copy signal relative to the end of the block 02. The block 12 includes 16 samples of X1(2m) including X1(0)-X1(15). The block 13 represents a copy signal relative to the beginning of the block 22. Further, in the memory 102_2, the block 21 represents a copy signal relative to the end of the block 12. The block 22 includes 16 samples of X2(2m) including X2(0)-X2(15). The block 23 represents a copy signal relative to the beginning of the block 32. Further, in the memory 102_3, the block 31 represents a copy signal relative to the end of the block 22. The block 32 includes 16 samples of X3(2m) including X3(0)-X3(15). The block 33 represents a reversed mirror signal relative to the end of the block 32.

That is, each of the memories 102_0-102_3 is configured to store a sampled signal (i.e., the block 02) in the corresponding subband and, in addition, at least one copy signal (i.e., the block 03) relative to the sampled signals in the area bordering on the neighboring subbands or a reversed mirror signal (i.e., the block 01) relative to the sampled signal of its own. With this configuration, each of the filter banks 104_0-104_3 is allowed to access only the corresponding one of the memories 102_0-102_3 and is therefore capable of performing a high speed subband analysis operation.

Figure 3:
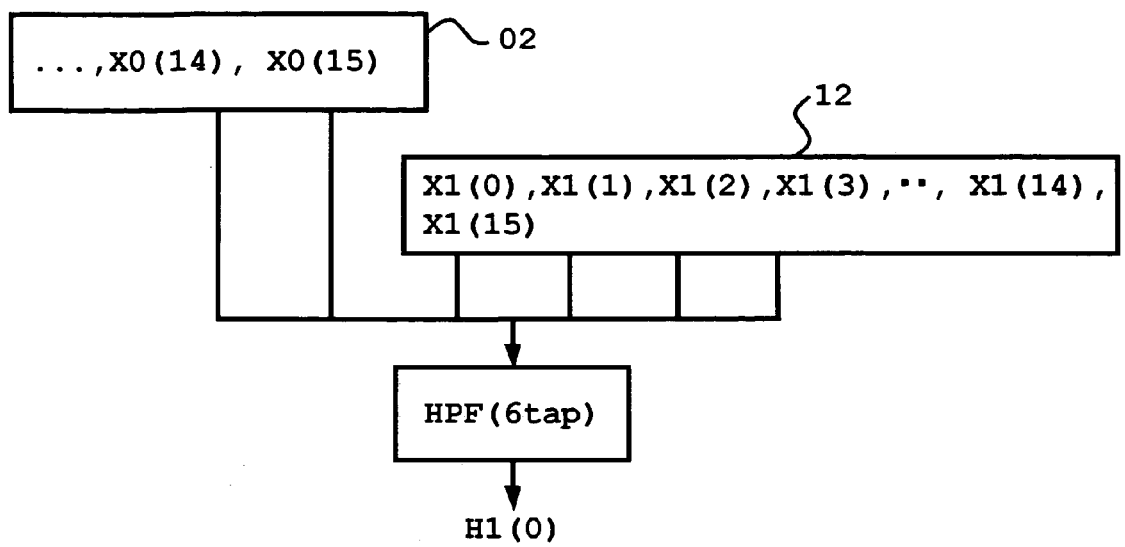
FIGS. 3 and 4 are illustrations explaining the reason why the block configuration of FIG. 2 is necessary.
Figure 4:
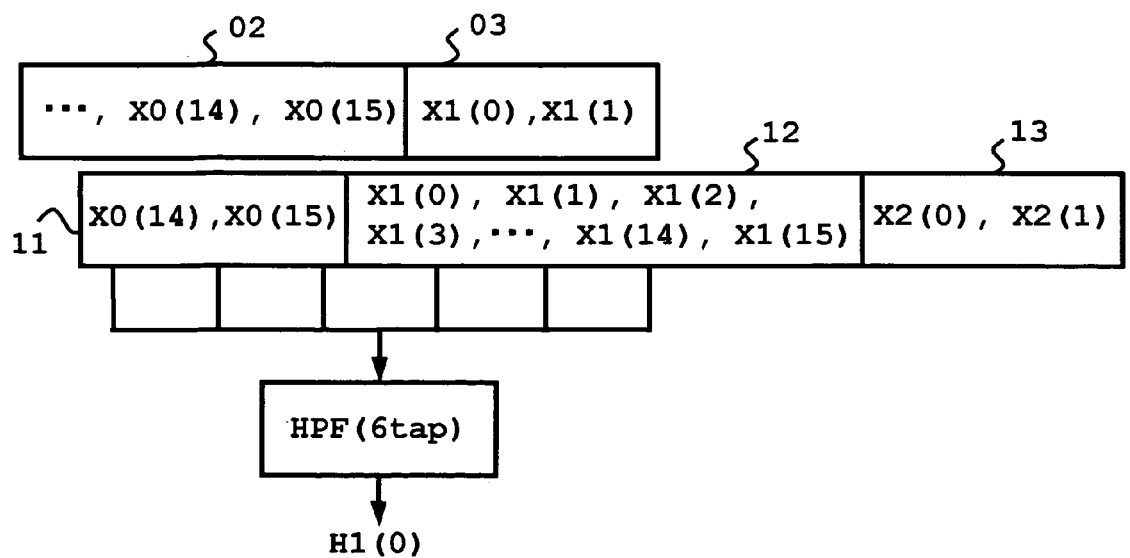

Referring to FIGS. 3 and 4, details of the high speed subband analysis operation is explained. Assuming that the memories 102_0-102_3 are configured to store only the sampled signals (i.e., the blocks 02, 12, 22, and 32), it is needed for a high pass filter, for example, to read out the signal of the immediately adjacent subband in addition to the signal of the present subband in order to generate a high pass coefficient signal. For example, as shown in FIG. 3, when a 6-tap high pass filter (HPF) generates a first high pass coefficient signal H1(0), it is needed to first access the memory 102_0 to read out the last two samples x0(14) and x0(15) of the block 02 and then to access the memory 102_1 to read out the first four samples X1(0), X1(1), X1(2), and X1(3) of the block 12. Although it is not shown, the 6-tap high pass filter (HPF) similarly operates when generating a last high pass coefficient signal H1(15). That is, the 6-tap HPF is required to first access the memory 102_1 to read out the last four samples X1(12), X1(13), X1(14), and X1(15) of the block 12 and then to access the memory 102_2 to read out the first two samples X2(0) and X2(1) of the block 22.

Thus, the 6-tap HPF is required to access at least two memories when the signal in the area bordering on the adjacent subband is processed, thereby bearing a relatively long access time. Such an access time forms a bottleneck restricting the time reduction for the high speed subband analysis operation. As a solution for this access time restriction, two memory access controls may be prepared; one for accessing two memories when the signal in the bordering area on the adjacent subband is processed and the other for accessing a single memory when the signal in other areas is processed. However, these memory access controls require a control for switching and, therefore, the mechanism becomes complex.

In the embodiment of the present invention, however, the memory 102_1, for example, is configured to store the block 11, including the copies of the last two samples X0(14) and X0(15) of the block 02, in addition to the block 12 including the samples X1(0)-X1(15), as shown in FIG. 4. Accordingly, the filter bank 104_1 can sequentially receive the samples X0(14), X0(15), X1(0), X1(1), X1(2), and X1(3) by accessing only the memory 102_1 so as to generate a first high pass coefficient signal H1(0). Further, since the memory 102_1 also stores the block 13, including the copies of the first two samples X2(0) and X2(1) of the block 22, the filter bank 104_1 is required to access only the memory 102_1 to receive the samples X1(12), X1(13), X1(14), X1(15), X2(0), and X2(1) in sequence when generating a last high pass coefficient signal H1(15).

In this way, the filter banks according to the embodiment of the present invention are required to access only one memory to perform the subband analysis operation, thereby avoiding the problem of the access time restriction described above with reference to FIG. 3.

Further, the memories 102_0 and 102_3 store the blocks 01 and 33, respectively, of the reversed mirror signals and the filter banks 104_0 and 104_3 need to access only the memories 102_0 and 102_3. That is, the memory 102_0 stores the block 01, including X0(1) and X0(0) relative to the first two samples X0(0) and X0(1) of the block 02, the filter bank 104_0 needs to access only the memory 102_0 to receive the samples X0(1), X0(0), X0(0), X0(1), X0(2), and X0(3) in sequence when generating a first high pass coefficient signal H0(1). Further, the memory 102_3 stores the block 33, including X3(15) and X3(14) relative to the last two samples X3(14) and X3(15) of the block 32, the filter bank 104_3 needs to access only the memory 102_3 to receive the samples X3(12), X3(13), X3(14), X3(15), X3(15), and X3(14) in sequence when generating a last high pass coefficient signal H3(15).

In this way, when handling the beginning of and the end of the signal, the filter banks need no additional reversing and mirroring operation and need to access only one memory to perform the subband analysis operation.

From the above, it may readily be understood that the filter banks 104_0-104_3 perform a subband analysis operation in a consistent way by accessing only the corresponding one of the memories 102_0-102_3 in a consistent way throughout the subband analysis operation. This results in increasing the speed of the subband analysis operation and in simplifying the associated hardware.

Figure 5:
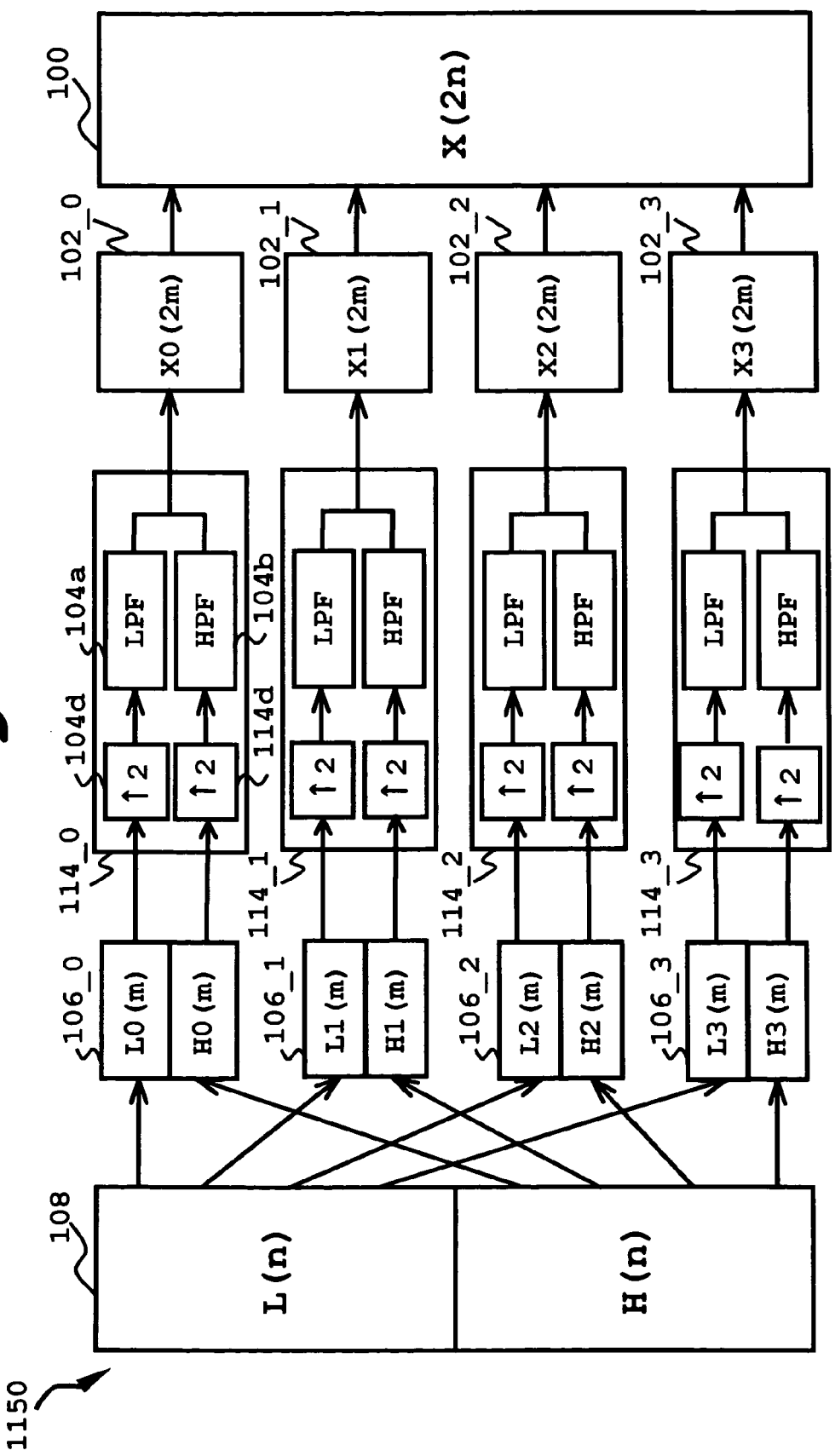
FIG. 5 is a block diagram of a subband analyzing apparatus based on the subband forming apparatus of FIG. 1.

Next, an exemplary subband synthesizing apparatus is explained with reference to FIG. 5. FIG. 5 illustrates a block diagram of a subband synthesizing apparatus 1150 which performs a subband synthesizing operation based on the four parallel processing. Since the subband synthesizing apparatus 1150 basically is the reverse equivalent of the subband forming apparatus 1100, the block diagram of FIG. 5 is similar to that of FIG. 1, except that the diagram is horizontally flipped. In addition, the subband synthesizing apparatus 1150 uses synthesizing filter banks 114_0-114_3 for reconstructing a signal, instead of using the analytic filter banks 104_0-104_3 for analyzing the one-dimensional input signal X(n).

In the thus-configured subband decoding apparatus 1150, an input signal is composed of low and high pass coefficient signals L(n) and H(n) made through the above-described subband coding operation, for example, and the signals L(n) and H(n) are stored in the memory 108. These signals L(n) and H(n) are then divided into the signals L0(m)-L3(m) and H0(m)-H3(m), respectively, of four subbands. The signals L0(m)-L3(m) and H0(m)-H3(m) are stored in the memories 106_0-106_3, respectively, as shown in FIG. 5.

Each of the filter banks 114_0-114_3 includes the low pass filter (LPF) 104a, the high pass filter (HPF) 104b, and two upsamplers 114d. Each of the upsamplers 114d compensates the signal by adding a 0-valued sample at the position where the signal is downsampled during the subband coding operation. These upsamplers 114d are indicated with a symbol ↑2, as shown in FIG. 5.

Since the input signals L(n) and H(n) are generated through the subband forming operation using the TS conversion by the above-described subband forming apparatus 1100, the subband synthesizing apparatus 1150 accordingly must use the reverse TS conversion. As described above, the TS conversion requires the technique for handling the signal in an area bordering on an adjacent subband. A technique similar to this is consequently required when the reverse TS conversion is used. That is, each of the filter banks 114_0-114_3 is required to additionally read the last low pass coefficient of the immediately previous subband and the first low pass coefficient of the following subband when processing the signal in the area bordering on the adjacent subband. Further, the filter bank 114_0 is required to additionally read the reversed mirror signal relative to the first low pass coefficient signal of the present subband and the filter bank 114_3 is required to additionally read the reversed mirror signal relative to the last low pass coefficient signal of the present subband.

Accordingly, in the subband synthesizing apparatus 1150, the memories 106_0-106_3 are respectively configured to additionally store the corresponding first and last low pass coefficients and the corresponding reversed mirror signals so as to allow the filter banks 114_0-114_3 to perform the above-described technique.

The filter banks 114_0-114_3, accordingly, reconstruct the signals X0(2m)-X3(2m), respectively, which are then stored in the memories 102_0-102_3, respectively. These signals X0(2m)-X3(2m) are accessed and gathered by the memory 100 so that the original signal X(n) is reconstructed and stored in the memory 100. The memory 100 may not necessarily be required.

In this way, the subband synthesizing apparatus 1150 can perform the relatively high speed subband synthesizing operation by allowing each of the filter banks to access only one corresponding memory and to obviate the need to generate the reversed mirror signals.

Figure 6:
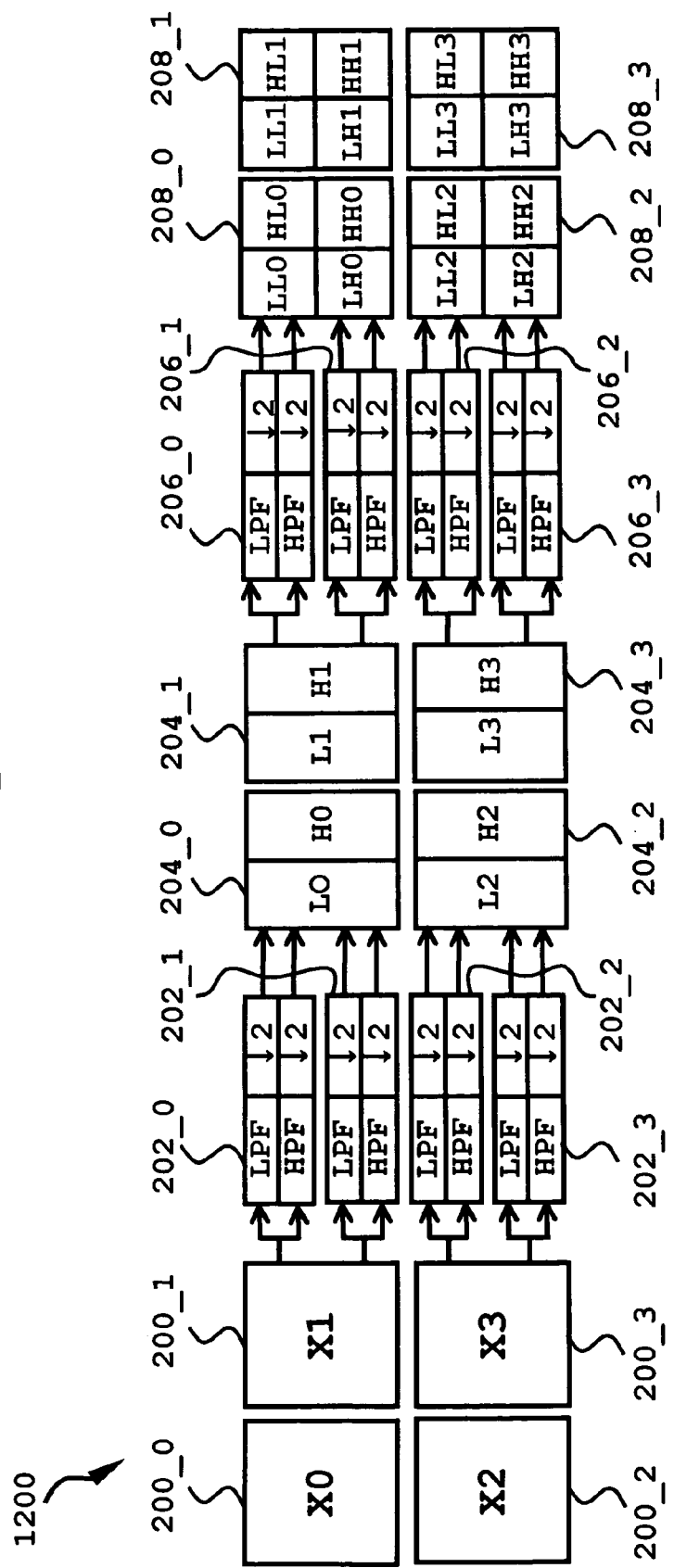
FIG. 6 is a block diagram of a wavelet conversion apparatus according to an embodiment of the present invention.

Next, an exemplary wavelet conversion apparatus applying the above-described subband forming operation to both associated horizontal and vertical operations is explained with reference to FIG. 6. A block diagram of a wavelet conversion apparatus 1200 is illustrated in FIG. 6. The wavelet conversion apparatus 1200 of FIG. 6 applies the techniques of the subband coding operation to the horizontal and vertical operations of the wavelet conversion. This wavelet conversion apparatus 1200 includes memories 200_0-200_3, filter banks 202_0-202_3, memories 204_0-204_3, filter banks 206_0-206_3 and memories 208_0-

208_3. In this case, the filter banks 202_0-202_3 and 206_0-206_3 are of an analysis type.

The wavelet conversion apparatus 1200 is given a two-dimension input signal such as an image signal having 16 by 16 samples, for example, as shown in FIG. 7. In the wavelet conversion apparatus 1200, the input image signal is divided into four sections each having 8 by 8 samples, as also shown in FIG. 7. The signals divided in the four sections are referred to as X0-X3. The signals X0-X3 are respectively stored in the memories 200_0-200_3 and are processed in parallel with the two-division subband coding operation in the horizontal direction by the filter banks 202_0-202_3. That is, as for the upper half of the 16- by 16-sample image signal, the sections X0 and X1, each having eight 8-sample rows, are processed in parallel with the two-division subband coding operation by the filter banks 202_0 and 202_1. Further, as for the lower half of the 16- by 16-sample image signal, the sections X2 and X3, each having eight 8-sample rows, are processed in parallel with the two-division subband coding operation by the filter banks 202_2 and 202_3.

In the above-described operation, when each filter bank uses, for example, the TS conversion in which three or more taps are used, handling of areas bordering on the adjacent subbands relative to each row causes a problem similar to that explained earlier with reference to FIG. 3.

In order to avoid such a problem as well as to achieve a relatively high operation speed and a simplified memory access control, in the wavelet conversion apparatus 1200, each of the memories 200_0-200_3 is configured to store the additional signals relative to the leading and trailing parts of each row of the input image signal in the corresponding section, as explained earlier with reference to FIG. 2, as well as the original signals relative to each row of the input image signal itself in the corresponding section.

For example, in the case of using the TS conversion, the memories 200_0-200_3 store the signals, as shown in FIG. 8. In FIG. 8, reference numeral 210, 220, 230, 240 denote the original 8-horizontally-aligned signals of the corresponding sections, and reference numeral 211, 212, 221, 222, 231, 232, 241, and 242 denote the corresponding additional 2-horizontally-aligned signals. Each of the additional signals 212, 221, 232, and 241 includes eight pairs of samples copied from two leading samples or two trailing samples placed in the horizontally adjacent row. Each of the additional signals 211, 222, 231, and 242 includes eight pairs of samples each of which is the reversed mirror signal made based on the signal of two leading samples and two trailing samples in the present row.

In this way, each of the memories 200_0-200_3 stores the additional signals relative to the leading and trailing parts of each row of the input image signal in the corresponding section as well as the original signals relative to each row of the input image signal itself in the corresponding section. Accordingly, each of the filter banks 202_0-202_3 is required to access only the corresponding one of the memories 200_0-200_3 so as to obtain the necessary signals.

After passing through the operations of the filter banks 202_0-202_3, the respective signals in the four sections will be output from the filter banks 202_0-202_3 in a form, as shown in FIG. 9. In FIG. 9, each coefficient is indicated in a form of Lxx or Hxx, wherein each x of xx represents one of 16 digits made of 0-9 and a-f. These coefficient signals are respectively stored in the memories 204_0-204_3. For example, the coefficient signals L00-L73 shown in FIG. 9 are stored in one half of the memory 204_0, referred to as L0 (see FIG. 6), and the coefficient signals H00-H73 shown in FIG. 9 are stored in the other one half of the memory 204_0, referred to as H0 (see FIG. 6). Then, the signals thus placed in the memories 204_0-204_3 are processed in parallel with the two-division subband coding operation in the vertical direction by the filter banks 206_0-206_3. That is, as for the left half of the 16- by 16-sample image signal, the sections L0 and L2 and H0 and H2, each having eight 8-sample columns, are processed in parallel with the two-division subband coding operation by the filter banks 206_0 and 206_1. Further, as for the right half of the 16- by 16-sample image signal, the sections L1 and L3 and H1 and H3, each having eight 8-sample columns, are processed in parallel with the two-division subband coding operation by the filter banks 202_2 and 202_3.

In the above-described operation, when each filter bank uses, for example, the TS conversion in which three or more taps are used, handling of areas bordering on the adjacent subbands relative to each column may cause a problem similar to that explained earlier with reference to FIG. 3.

In order to avoid such a problem as well as to achieve a relatively high operation speed and a simplified memory access control, in the wavelet conversion apparatus 1200, each of the memories 204_0-204_3 is configured to store the additional signals relative to the leading and trailing parts of each column of the input image signal in the corresponding section as well as the original signals relative to each column of the input image signal itself in the corresponding section.

For example, in the case of using the TS conversion, the memories 204_0-204_3 store the signals, as shown in FIG. 10. In FIG. 10, reference numeral 310, 320, 330, 340 denote the original 8-vertically-aligned signals of the corresponding sections, and reference numeral 311, 312, 321, 322, 331, 332, 341, and 342 denote the corresponding additional 2-vertically-aligned signals. Each of the additional signals 312, 322, 331, and 341 includes eight pairs of samples each of which is copied from two leading samples or two trailing samples placed in the vertically adjacent column. Each of the additional signals 311, 321, 332, and 342 includes eight pairs of samples each of which is the reversed mirror signal made based on the signal of two leading samples and two trailing samples in the present column.

Thus, each of the memories 204_0-204_3 stores the additional signals relative to the leading and trailing parts of each column of the input image signal in the corresponding section as well as the original signals relative to each column of the input image signal itself in the corresponding section. Accordingly, each of the filter banks 206_0-206_3 is required to access only the corresponding one of the memories 204_0-204_3 so as to obtain the necessary signals.

In this way, the wavelet conversion apparatus 1200 performs the wavelet conversion for one layer of resolution. As a result, the memories 208_0-208_3 corresponding to the four divided sections store resultant coefficient signals, as shown in FIG. 11. The resultant coefficient signals of FIG. 11 are respectively referred to as LLxx and HHxx, wherein each x of xx is represented by one of 16 digits made of 0-9 and a-f.

Figure 12:
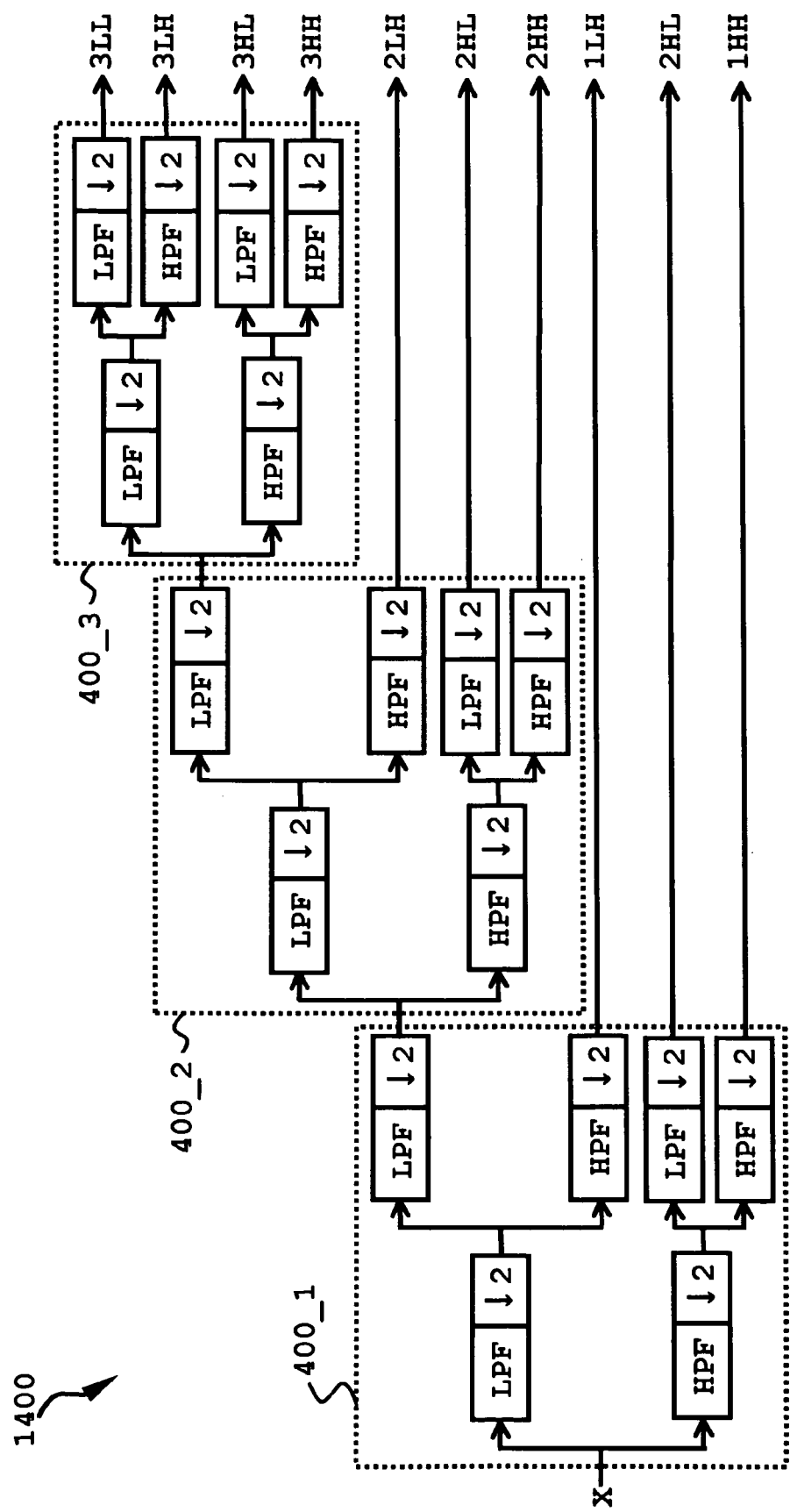
FIG. 12 is a block diagram of a multi-layer wavelet conversion apparatus according to an embodiment of the present invention.

In general, the wavelet conversion has a characteristic of recursive performance relative to the coefficient signals LLxx. Therefore, an apparatus that cascades the wavelet conversion apparatuses of FIG. 6 can perform conversion for a plurality of resolution layers. FIG. 12 shows a block diagram of an exemplary multi-layer wavelet conversion apparatus 1400 which performs a wavelet conversion for three resolution layers, for example. In FIG. 12, the multi-layer wavelet conversion apparatus 1400 includes wavelet conversion units 400_1-400_3. Each of these wavelet conversion units 400_1-400_3 is similar to the wavelet conversion apparatuses 1200 of FIG. 6.

Figure 13:
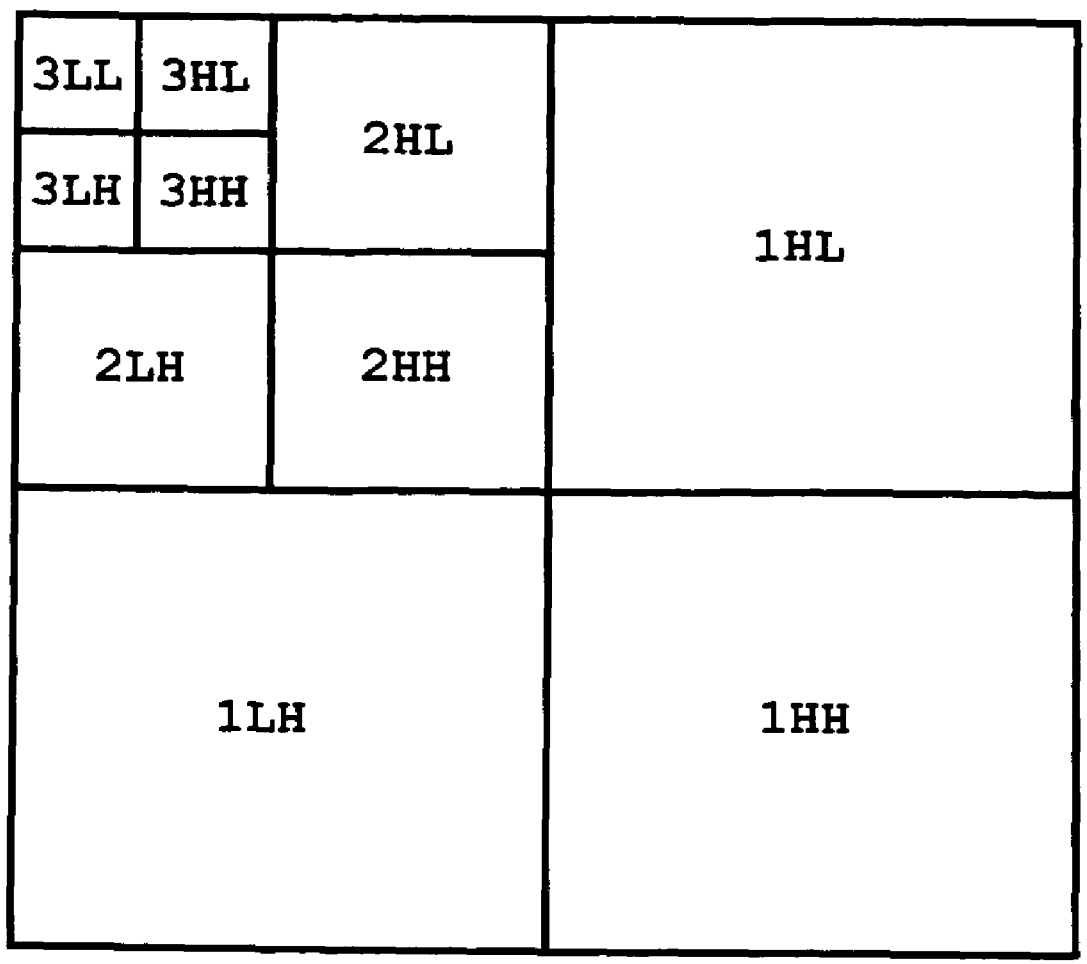
FIG. 13 is an illustration showing a manner of a three-layered subband analytic operation performed by the multi-layer wavelet conversion apparatus of FIG. 12.

The wavelet conversion unit 400_1 performs conversion of a first resolution layer relative to an input signal X. Among the coefficient signals, LL coefficient signals output from the wavelet conversion unit 400_1 are input to the wavelet conversion unit 400_2 which then performs conversion of a second resolution layer relative to the LL coefficient signals. In a similar way, the wavelet conversion unit 400_3 receives the LL coefficient signals from the wavelet conversion unit 400_2 and performs conversion of a third resolution layer relative to the LL coefficient signals. Through these operations, the multi-layer wavelet conversion apparatus 1400 outputs coefficient signals 1HH, 1HL, 1LH, 2HH, 2HL, 2LH, 3HH, 3HL, 3LH, and 3LL, as shown in FIG. 12. The manner of this subband analysis with the three-layered wavelet conversion relative to the two-dimension input signal is shown in FIG. 13.

Figure 14:
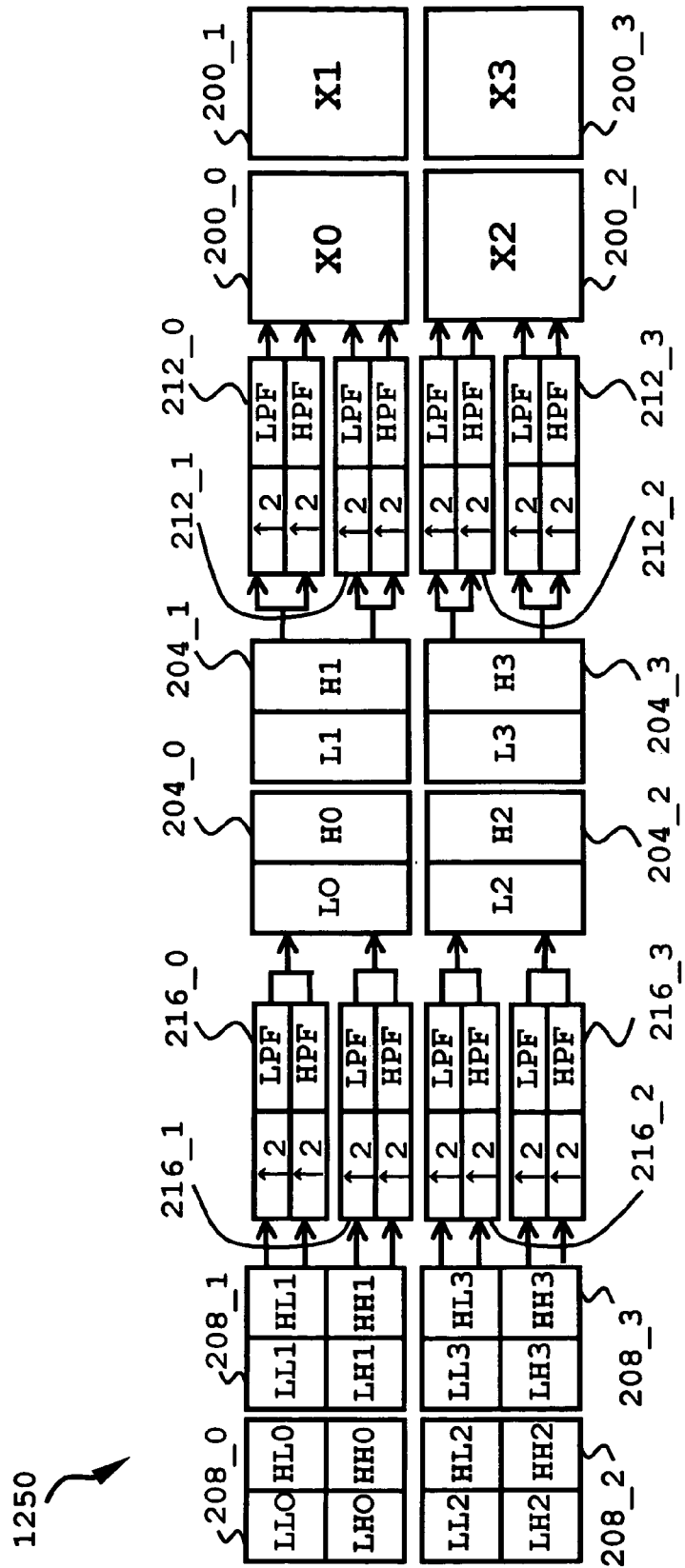
FIG. 14 is a block diagram of a wavelet reverse conversion apparatus based on the wavelet conversion apparatus of FIG. 6.

Next, an exemplary wavelet reverse conversion apparatus for reconstructing the above-described wavelet conversion coefficient signals into a two-dimension signal such as an image signal is explained with reference to FIG. 14. FIG. 14 illustrates a block diagram of an exemplary wavelet reverse conversion apparatus 1250 that performs a wavelet reverse conversion operation based on the four parallel processing. The wavelet reverse conversion apparatus 1250 uses the subband synthesizing techniques described earlier with reference to FIG. 5 for operations both in the vertical and horizontal directions. Since the wavelet reverse conversion apparatus 1250 basically is the reverse equivalent of the wavelet conversion apparatus 1200, the block diagram of FIG. 14 is similar to that of FIG. 6, except that the diagram is horizontally flipped. In addition, the filter banks 202_0-202_3 and 206_0-206_3 of FIG. 6 are replaced with filter banks 212_0-212_3 and 216_0-216_3 having the low and high pass filters and upsampler, as shown in FIG. 14. The wavelet conversion apparatus 1200 of FIG. 6 uses the analytic filter banks 202_0-202_3 and 206_0-206_3 to analyze the two-dimensional input signal including X0-X3, as described above, but the wavelet reverse conversion apparatus 1250 of FIG. 14 uses the synthesis filter banks 114_0-114_3 for reconstructing signals.

In the thus-configured wavelet reverse conversion apparatus 1250, the coefficient signals LL, LH, HL, and HH shown in FIG. 11 are handled as input signals. These signals are divided into the four subbands and are stored in the corresponding locations in the memories 208_0-208_3, respectively, as shown in FIG. 14. The coefficient signals stored in the memories 208_0-208_3 are then subband-synthesized in the vertical direction in parallel by the synthesis filter banks 216_0-216_3 so that the coefficients L and H are reconstructed.

If, for example, the reverse TS conversion requiring three filter taps or more is used in the above-mentioned operations, the wavelet reverse conversion apparatus 1250 is required to use a technique similar to that described in the description with respect to the subband synthesizing apparatus 1150. More specifically, each of the filter banks 216_0-216_3 is required to read the last coefficient of the immediately previous subband and the first coefficient of the following subband when processing the signal in a row in the vertical direction in areas bordering on these adjacent subbands. Further, the filter bank 216_0 is required to read a reversed mirror signal relative to the first coefficient signal in each row of the present subband and the filter bank 216_3 needs to read a reversed mirror signal relative to the last coefficient signal in each row of the present subband.

In order to allow the filter banks 216_0-216_3 to read the coefficients of the adjacent subbands as described above without the need to access other memories, the memories 208_0-208_3 are configured to additionally store the coefficients copied from the corresponding first and last coefficients and the corresponding reversed mirror signals, as shown in FIG. 10. With the thus-configured memories 208_0-208_3, the filter banks 216_0-216_3 perform the synthetic operations on the coefficients of FIG. 10 and accordingly output the signals L0 and H0, L1 and H1, L2 and H2, and L3 and H3, respectively, having the coefficients as shown in FIG. 9. Then, the signals L0 and H0, L1 and H1, L2 and H2, and L3 and H3 of FIG. 9 are stored in the memories 204_0-204_3, respectively, as shown in FIG. 14. In this way, the L and H coefficient signals can be reconstructed.

The L and H coefficient signals thus reconstructed and stored in the memories 204_0-204_3 are then subband-synthesized in the horizontal direction in parallel by the synthesis filter banks 212_0-212_3 so that the original input signal X is reconstructed in the form of X0-X3 in the four subbands at the following memories 200_0-200_3, as shown in FIG. 14.

In this case, to avoid the problem of the reverse TS conversion, the wavelet reverse conversion apparatus 1250 uses a technique similar to that described in the description with respect to the subband synthesizing apparatus 1150. More specifically, each of the filter banks 212_0-212_3 is required to read the last coefficient of the immediately previous subband and the first coefficient of the following subband when processing the signal in a column in the horizontal direction in areas bordering on these adjacent subbands. Further, the filter bank 212_0 is required to read a reversed mirror signal relative to the first coefficient signal in each column of the present subband and the filter bank 212_3 is required to read a reversed mirror signal relative to the last coefficient signal in each column of the present subband.

In order to allow the filter banks 212_0-212_3 to read the coefficients of the adjacent subbands as described above without the needs to access other memories so as to avoid the problem of the reverse TS conversion, the memories 204_0-204_3 are configured to additionally store the coefficients copied from the corresponding first and last coefficients and the corresponding reversed mirror signals, as shown in FIG. 8. With the thus-configured memories 204_0-204_3, the filter banks 212_0-212_3 perform the synthesis operations on the coefficients of FIG. 8 and accordingly output the signals X0-X3, respectively, having coefficients as shown in FIG. 7. Then, the signals X0-X3 of FIG. 7 are stored in the memories 200_0-200_3, respectively, as shown in FIG. 14.

In this way, the wavelet reverse conversion apparatus 1250 can reconstruct the signal X in a relatively fast and simple manner.

Figure 15:
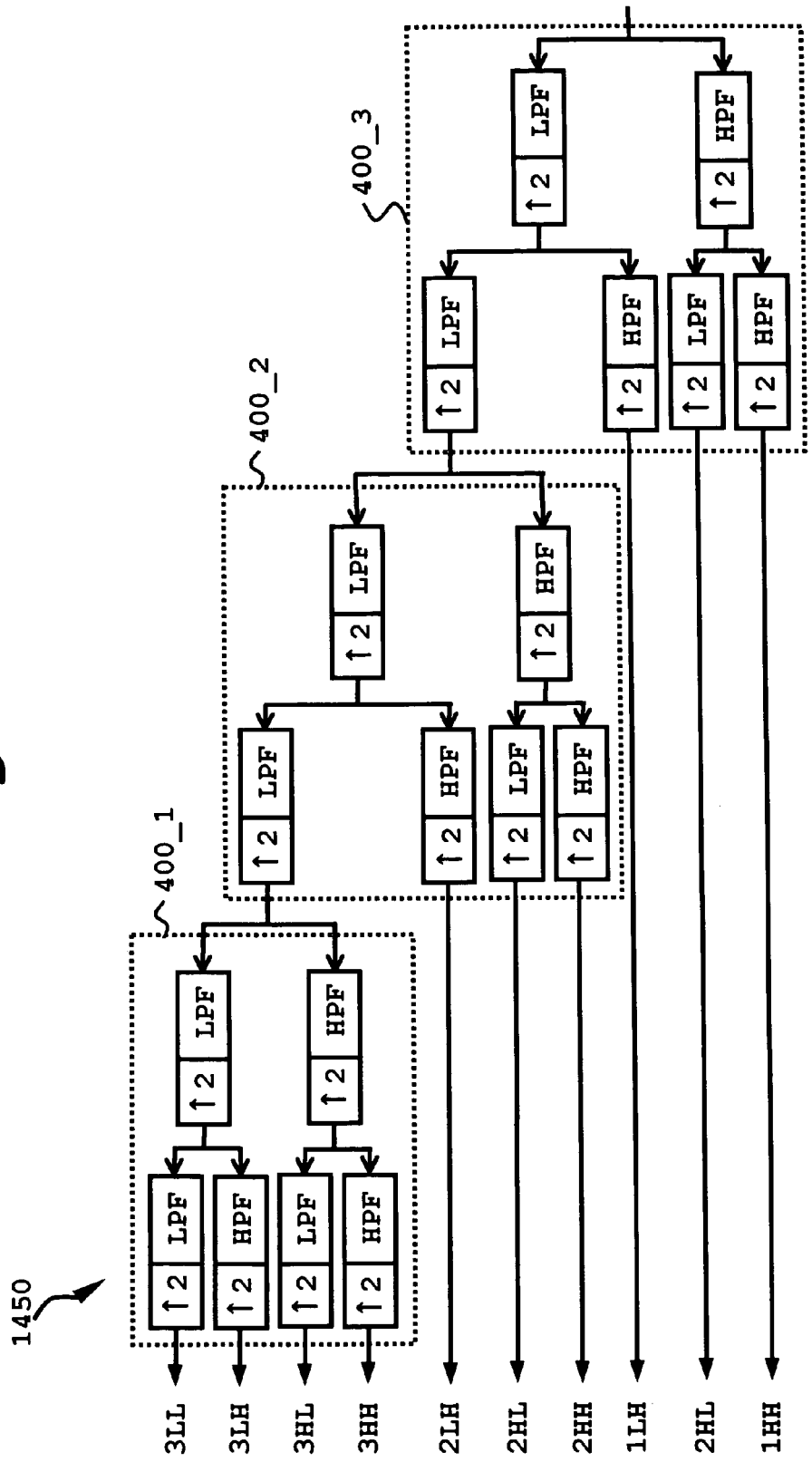
FIG. 15 is a block diagram of a multi-layer wavelet reverse conversion apparatus based on the multi-layer wavelet conversion apparatus of FIG. 12.

From the above, it will readily be understood that it is possible to make a multi-layer wavelet reverse conversion apparatus that performs a wavelet reverse conversion for three resolution layers by replacing each of the wavelet conversion units 400_0-400_3 of FIG. 12 with wavelet reverse conversion units equivalent to the wavelet reverse conversion apparatus 1250 of FIG. 14. FIG. 15 shows an exemplary three-layer wavelet reverse conversion apparatus 1450 which includes wavelet reverse conversion units 450_0-450_3 each of which is equivalent to the wavelet reverse conversion apparatus 1250 of FIG. 14.

Figure 16:
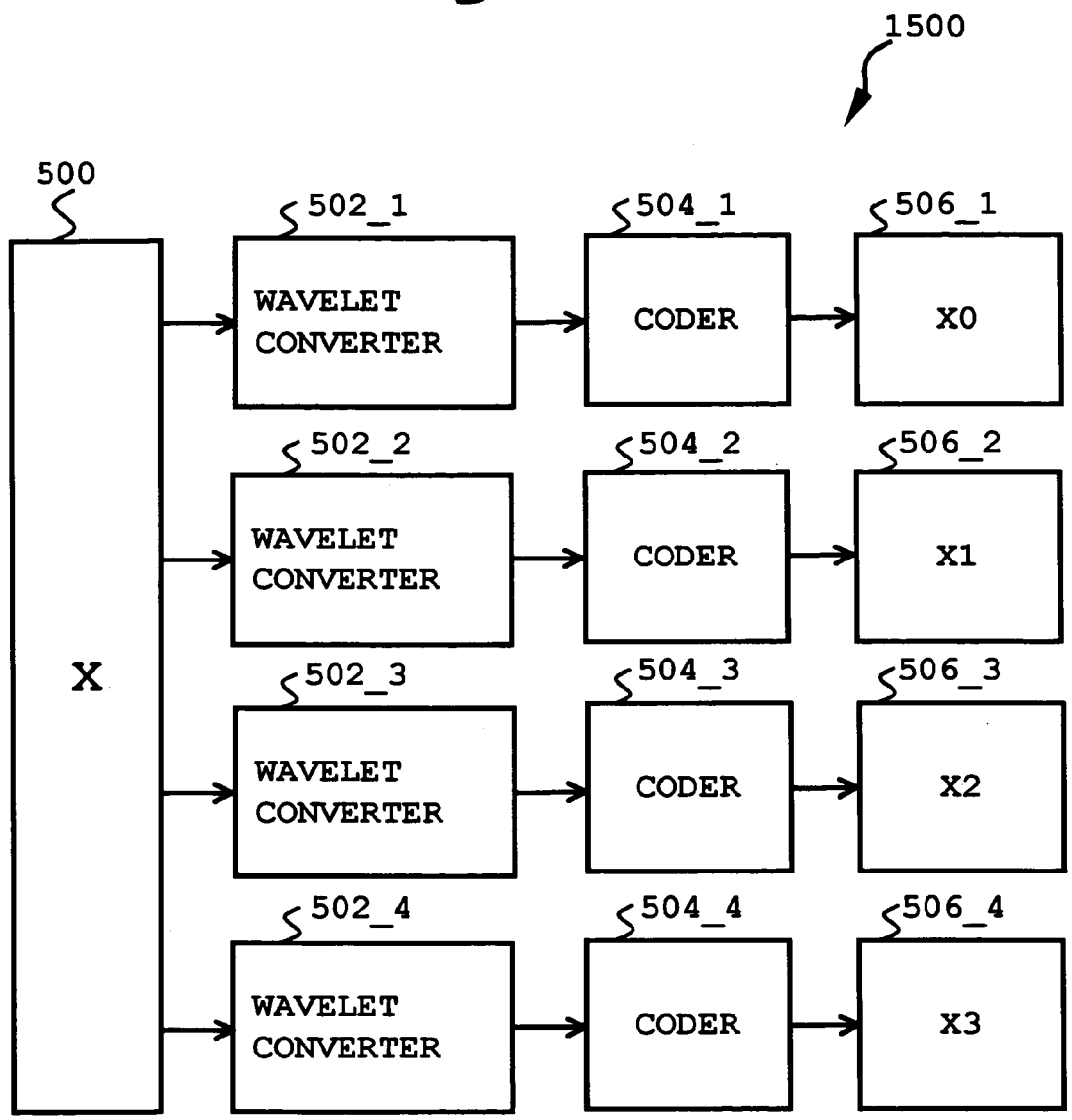
FIGS. 16 and 17 are block diagrams of data compression and decompression apparatuses, respectively, according to embodiments of the present invention.

Referring now to FIG. 16, a data compression apparatus 1500 is explained. FIG. 16 shows a block diagram of the data compression apparatus 1500 which includes an input buffer 500, wavelet converters 502_1-502_4, coders 504_1-504_4, and output buffers 506_1-506_4. Each one of the wavelet converters 502_1-502_4, each one of the coders 504_1-504_4, and each one of the output buffers 506_1-506_4 forms a compression and coding subset. Each of the wavelet converters 502_1-502_4 can be the wavelet conversion apparatus 1200 of FIG. 6, for example. Each of the coders 504_1-504_4 can be the subband forming apparatus 1100 of FIG. 1, for example. The data compression apparatus 1500 divides an input signal X into four subbands with the input buffer 500. The divided signals in the four subbands are processed with the wavelet converters 502_1-502_4, respectively, of the four compression and coding subsets in parallel.

Each of the wavelet converters 502_1-502_4 performs the wavelet conversion operation described in the description with respect to the wavelet conversion apparatuses 1200 and 1400 referring to FIGS. 6 and 12, respectively. Therefore, the input signal X can be processed with the relatively high speed wavelet conversion.

The wavelet coefficient signals separated in the respective four subbands output from the wavelet converters 502_1-502_4 are input into the coders 504_1-504_4, respectively. Then, the coders 504_1-504_4 respectively code the wavelet coefficient signals in the four subbands in parallel and output compressed and coded signals which are stored in the output buffers 506_1-506_4, respectively.

Figure 17:
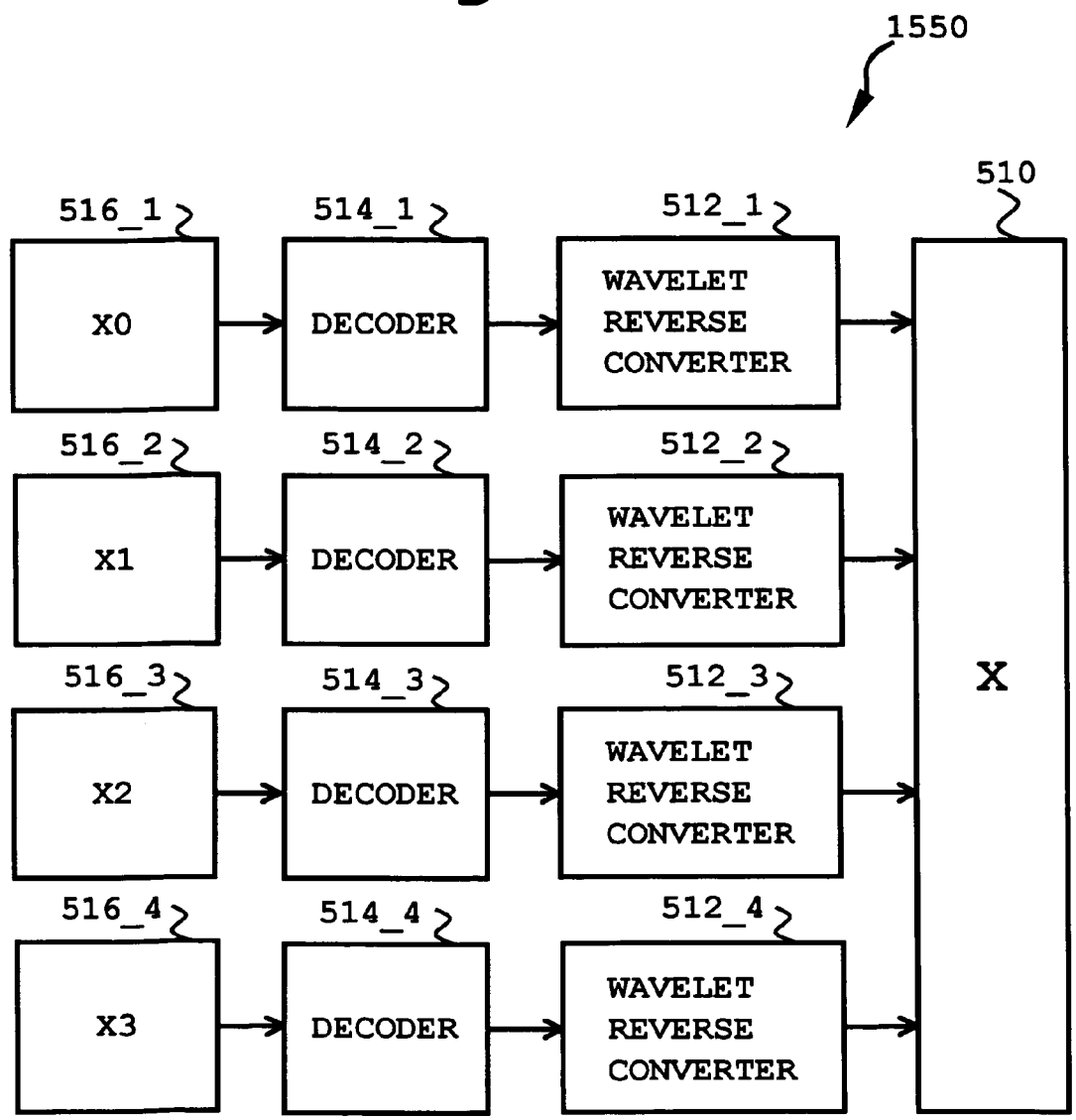

On the other hand, it is also possible to make a data decompression apparatus using a plurality of the above-described wavelet reverse converters. FIG. 17 shows a block diagram of an exemplary data decompression apparatus 1550 which includes input buffers 516_1-516_4, decoders 514_1-514_4, wavelet reverse converters 512_1-512_4, and an output buffer 510. Each one of the input buffers 516_1-516_4, each one of the decoders 514_1-514_4, and each one of the wavelet reverse converters 512_1-512_4 forms a compression and coding subset. Each of the wavelet reverse converters 512_1-512_4 can be the wavelet reverse conversion apparatus 1250 of FIG. 14, for example. Each of the decoders 514_1-514_4 can be the subband synthesizing apparatus 1150 of FIG. 5, for example. The data decompression apparatus 1550 decodes four input signals X0-X3 of the respective input buffers 516_1-516_4 with the decoders 514_1-514_4, respectively. The decoded signals in the respective four subbands are processed with the wavelet reverse converters 512_1-512_4, respectively, in parallel. Accordingly, the wavelet reverse converters 512_1-512_4 output the respective output signals which form the original signal X.

Each of the wavelet reverse converters 512_1-512_4 performs the wavelet reverse conversion operation described in the description with respect to the wavelet reverse conversion apparatuses 1250 and 1450 referring to FIGS. 14 and 15, respectively. Therefore, the input signals X0-X3 can be processed in parallel with the relatively high speed wavelet conversion.

In addition, it is also possible to make a data compression and decompression apparatus, using a single wavelet conversion and reverse conversion apparatus and a single coding and decoding apparatus, for performing compression and decompression operations. In this data compression and decompression apparatus, the single wavelet conversion and reverse conversion apparatus includes the above-described wavelet converter and the wavelet reverse converter and the single coding and decoding apparatus includes the known coder and decoder.

Figure 18:
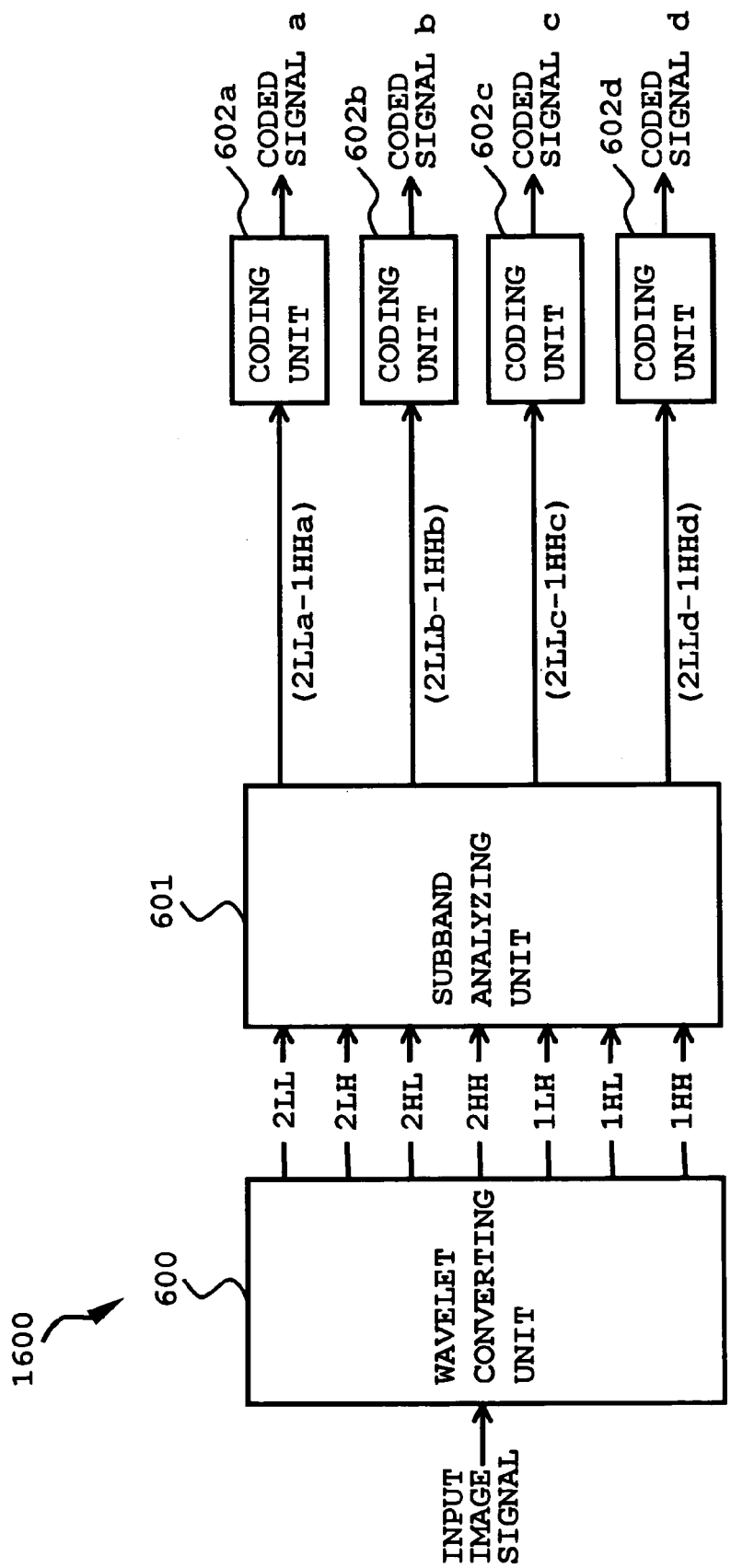
FIG. 18 is a block diagram of another wavelet conversion apparatus according to an embodiment of the present invention.

Next, another exemplary wavelet conversion apparatus according to another embodiment of the present invention is explained with reference to FIG. 18. FIG. 18 shows a block diagram of a wavelet conversion apparatus 1600 which includes a wavelet converting unit 600, a wavelet coefficient analyzing unit 601, and coding units 602a-602d The wavelet converting unit 600 is similar to the wavelet converter 800 of FIG. 24, and performs the two-layer wavelet conversion relative to an input two-dimension signal such as an image signal. Accordingly, the wavelet converting unit 600 outputs the wavelet conversion coefficients subband-analyzed, as shown in FIG. 25.

The wavelet coefficient analyzing unit 601 analyzes the wavelet coefficients to separate them into, for example, four groups in accordance with spatial region. Each of the four groups includes the wavelet coefficients locating in a same spatial region. As shown in FIG. 18, the wavelet coefficients in the four spatial regions are indicated with subscripts a, b, c, and d, respectively.

Figure 19:
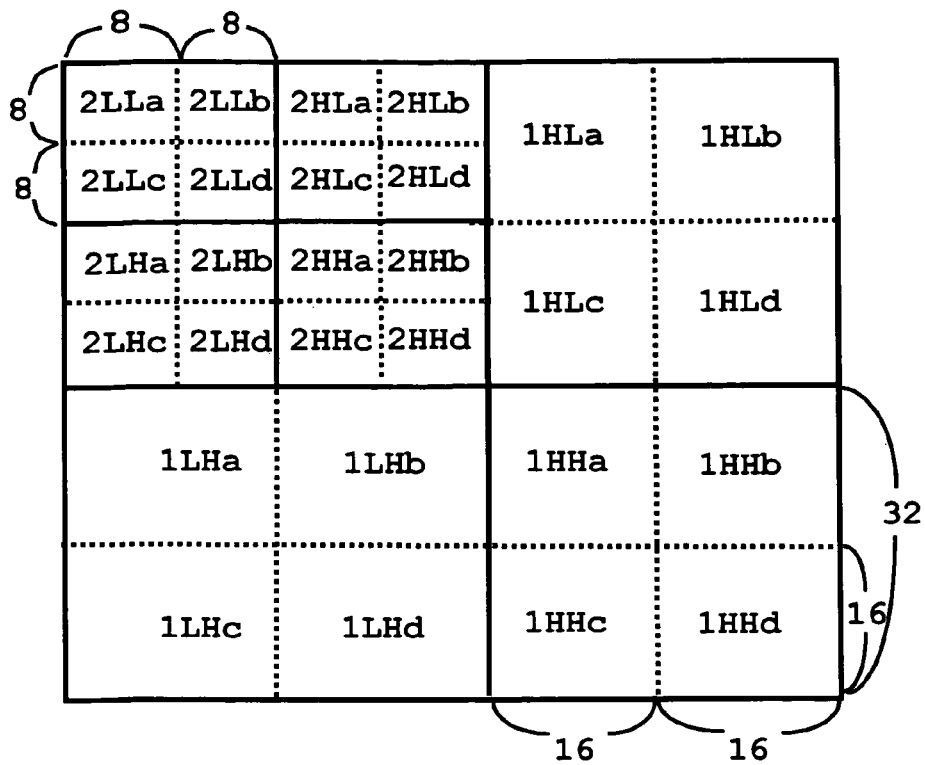
FIGS. 19 and 20 are illustrations for explaining manners of multi-layer subband analytic operations performed by the wavelet conversion apparatus of FIG. 18.

With this wavelet coefficient analyzing unit 601, a 64y 64t two-dimension signal, for example, is analyzed into 32y 32t coefficients in the first layer and into 16by 16-bit coefficients in the second layer. In this case, as shown in FIG. 19, each of 1HL, 1LH, 1HH can be analyzed into a region having four 16-by 16-bit blocks and each of 2LL, 2HL, and 2HH can be analyzed into a region having four 8-by 8-bit blocks. As an alternative, as shown in FIG. 20, each of 1HL, 1LH, 1HH can be analyzed into a region having four 32-by 8-bit blocks and each of 2LL, 2HL, and 2HH can be analyzed into a region having four 16-by 4-bit blocks.

Figure 24:
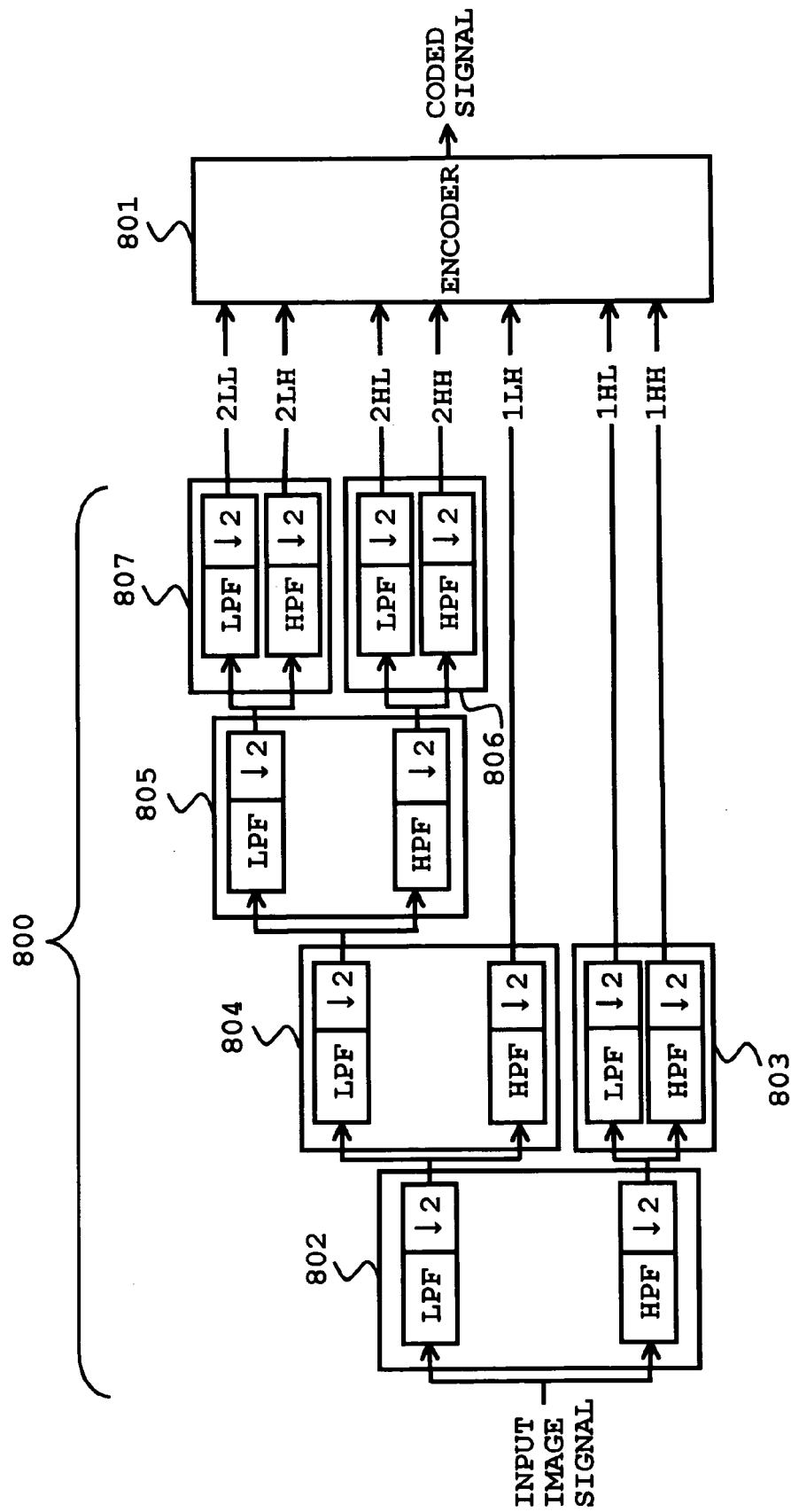
FIGS. 24-26 are illustrations for explaining conventional wavelet conversion apparatuses.
Figure 25:
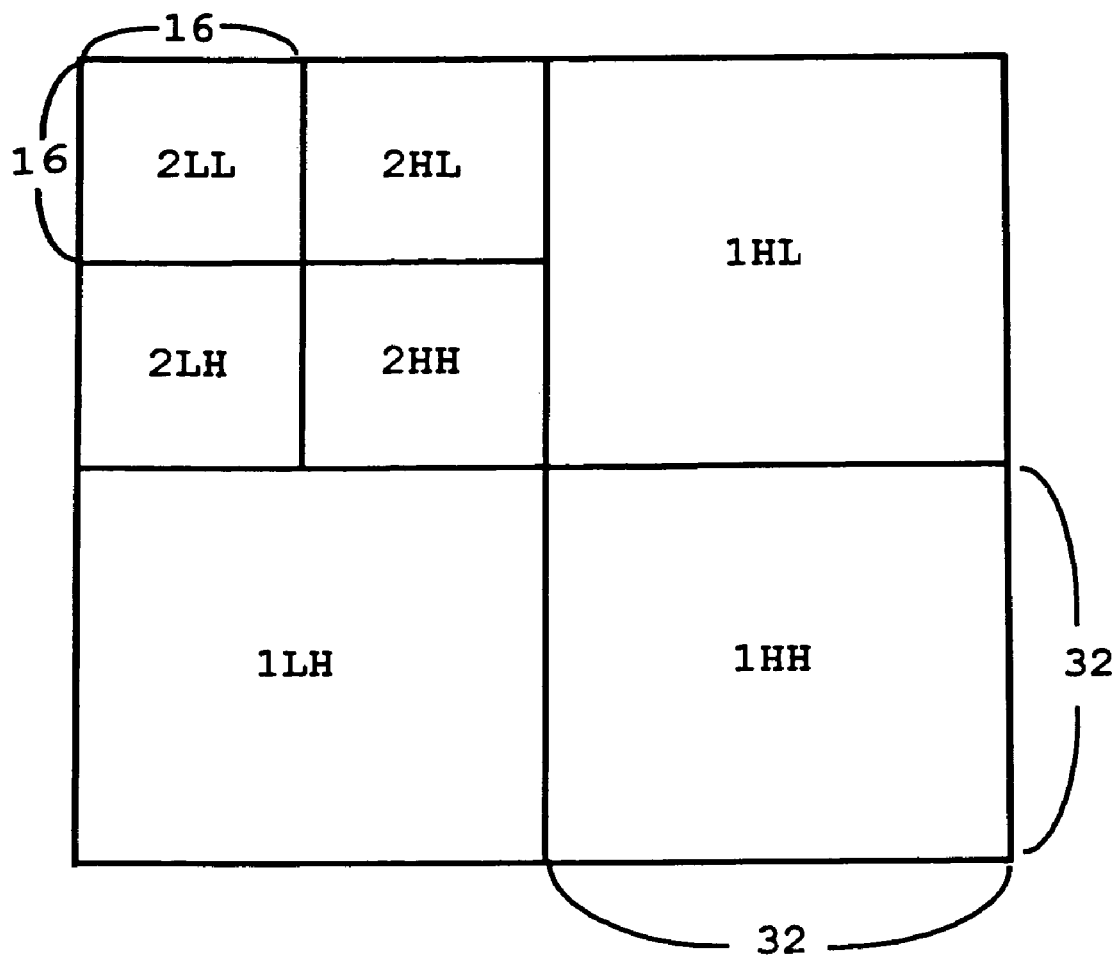

Each of the coding units 602a-602d is similar to the encoder 801 of FIG. 24, and receives the corresponding output from the wavelet coefficient analyzing unit 601. The coding units 602a-602d perform the coding operations in parallel relative to the received coefficients and output the coded signals a-d, respectively. Each of these output coded signals a-d includes the spatial location information for specifying the corresponding region of the wavelet conversion coefficient. With this spatial location information, the wavelet reverse conversion apparatus can make sure to reconstruct the original image even when the way of block separation is uncertain.

In this type of data compression apparatus, it is preferable to configure the wavelet conversion coefficients using the known tree system so that coding of the wavelet conversion coefficients can be performed in an efficient manner. Since the tree system is retained in the above coefficients of the spatially-divided regions, the coding units 602a-602d can efficiently perform the coding operations. In addition, the way of dividing the regions, as shown in FIG. 20, is efficient particularly when the coding units 602a-602d perform the known 16-bit look-ahead operation (i.e., a 8-by 2-bit length). In addition, the coding units 602a-602d can advantageously be configured in a consistent manner if the operation is performed in each layer such that every region has a consistent ratio of vertical and horizontal lengths and a consistent number of coefficients. From this, it is readily understood that a plurality of decoding units can be configured in a consistent manner in a decoding apparatus having these decoding units for performing parallel decoding operations relative to coded signals in a plurality of coefficient groups.

Figure 20:
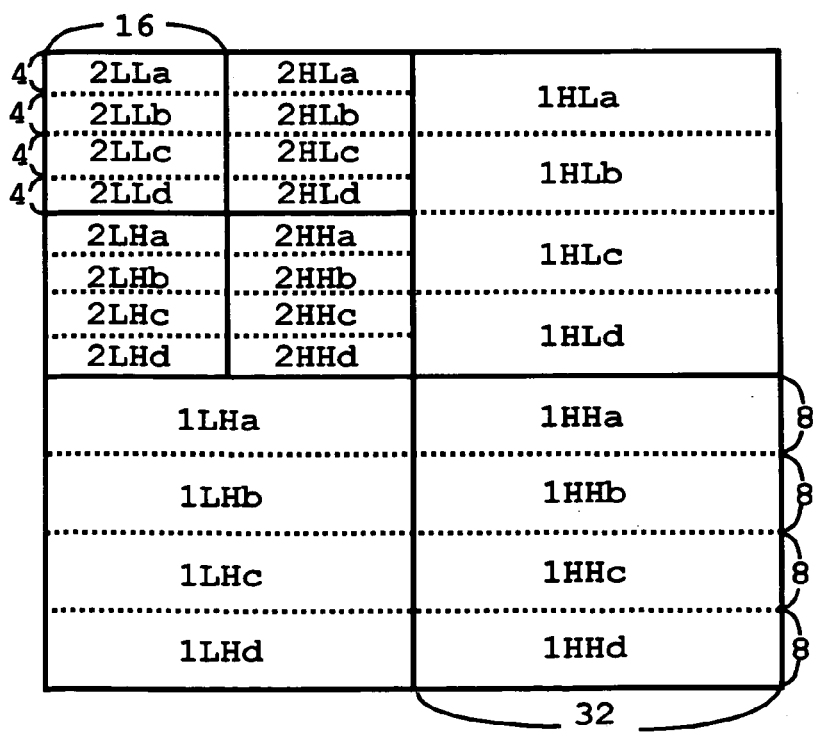

When the wavelet conversion coefficients is divided relative to the spatial region, whether the division is made in a square form, as shown in FIGS. 19 and 20, depends on the size of the two-dimension input signal. If the division is not made in a square form, the wavelet conversion apparatus 1600 can divide the signal into a square portion and a remaining portion so as to perform an effective division of spatial region relative to each layer of the wavelet conversion. Each of FIGS. 21 and 22 shows a division of 1HH, for example, wherein A indicates a square region and B, C, and D indicate irregular regions.

Figures 21, 22:
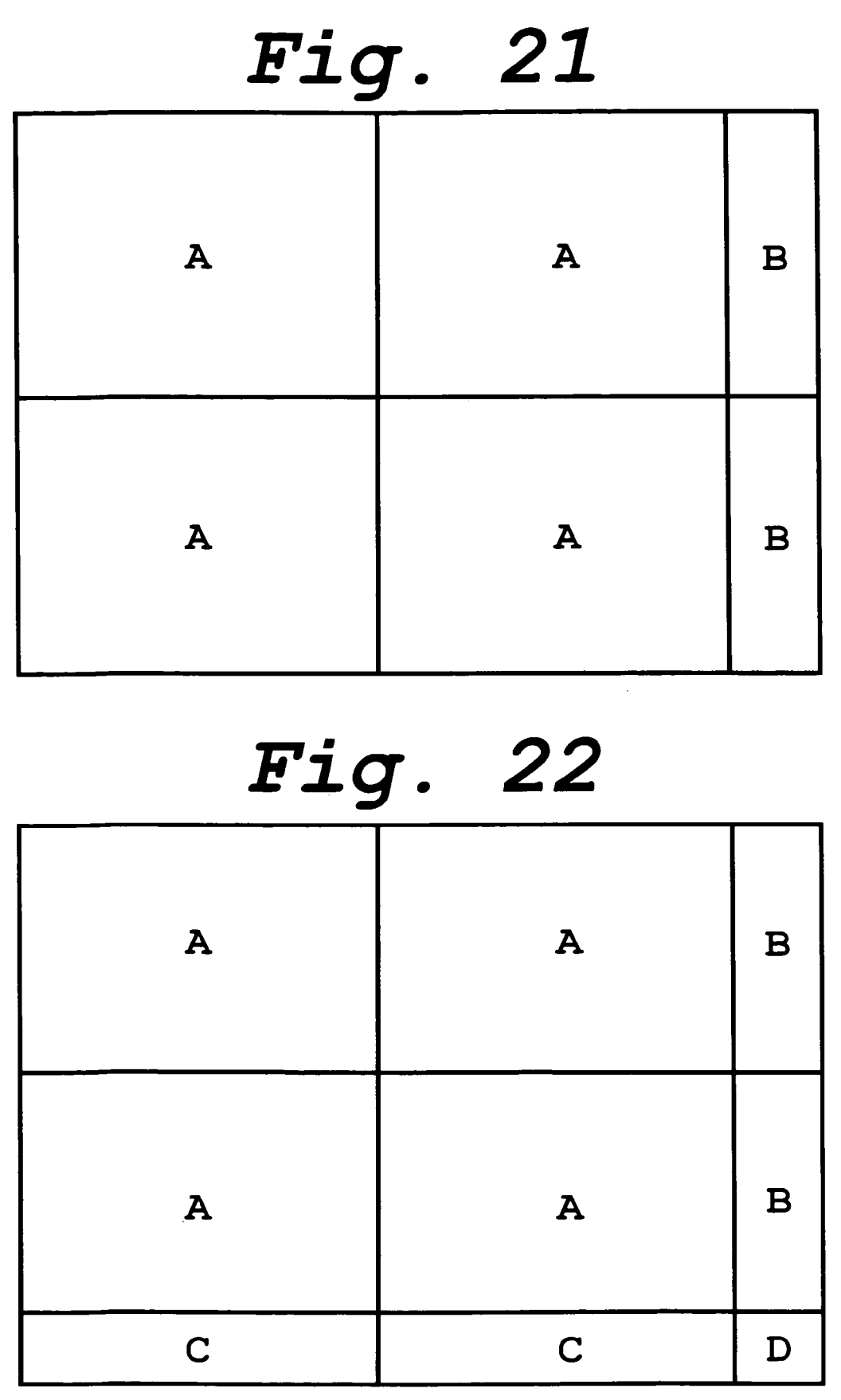

In the case of FIG. 21, the four coding units 602a-602d perform the coding operations in parallel relative to the coefficients in the square regions A. At the same time, the coefficients in the irregular regions B are gathered and are subjected to an extra coding operation performed by an additional coding unit (not shown). Alternatively, the coefficients in the irregular regions B are subjected to extra coding operations performed in parallel by two additional coding units (not shown).

In the case of FIG. 22, the four coding units 602a-602d perform the coding operations in parallel relative to the coefficients in the square regions A. At the same time, the coefficients in the irregular regions B are gathered and are subjected to an extra coding operation and the coefficients in the irregular regions C and D are gathered and are subjected to another extra coding operation.

In these cases, it is preferable to divide the region such that a number of the square regions is greater than that of the irregular regions. This is because if the number of the square regions is smaller than that of the irregular regions the speed of conversion will be largely effected by the processing of the irregular regions.

In this way, the wavelet conversion apparatus 1600 can handle a two-dimension input signal of an arbitrary size.

Figure 23:
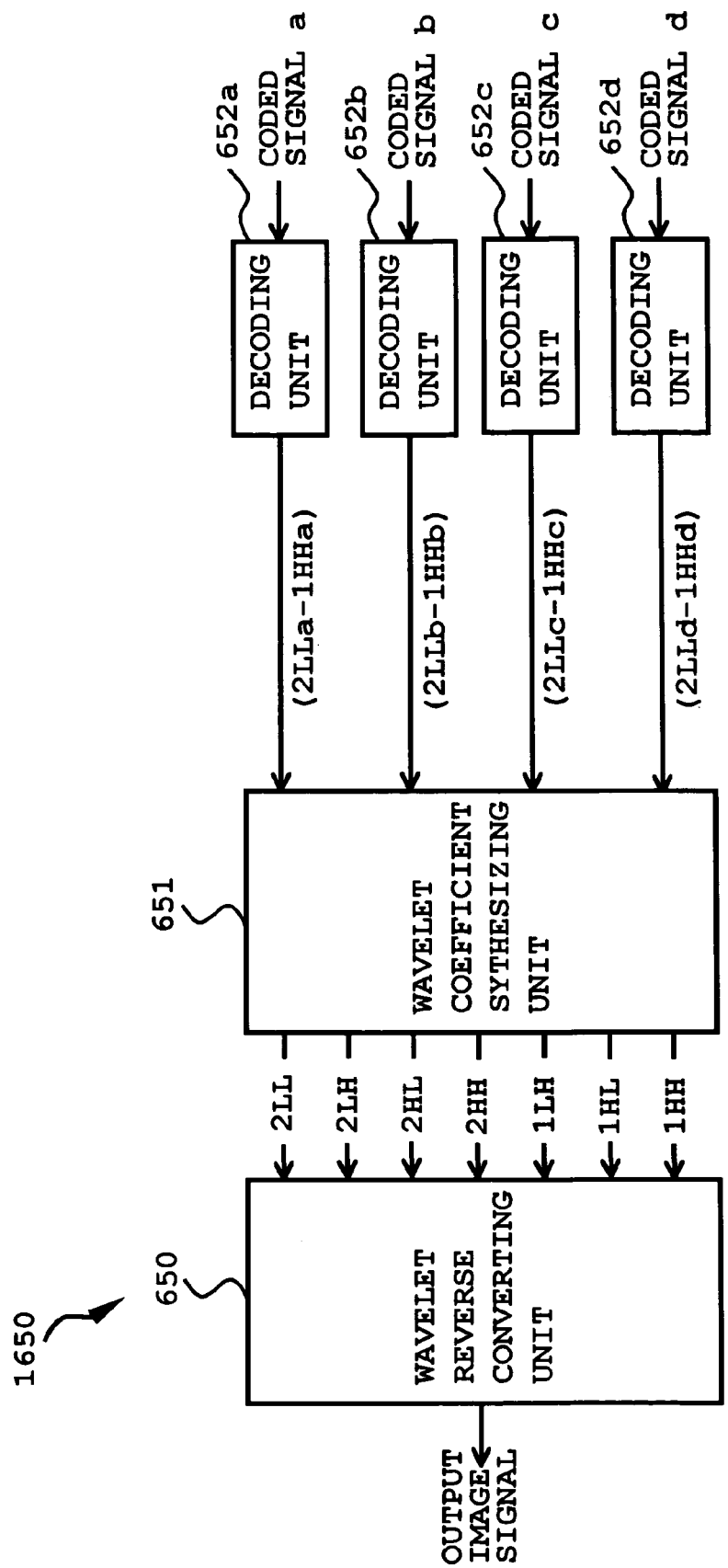
FIG. 23 is a block diagram of a wavelet reverse conversion apparatus based on the wavelet reverse conversion apparatus of FIG. 18.
Figure 26:
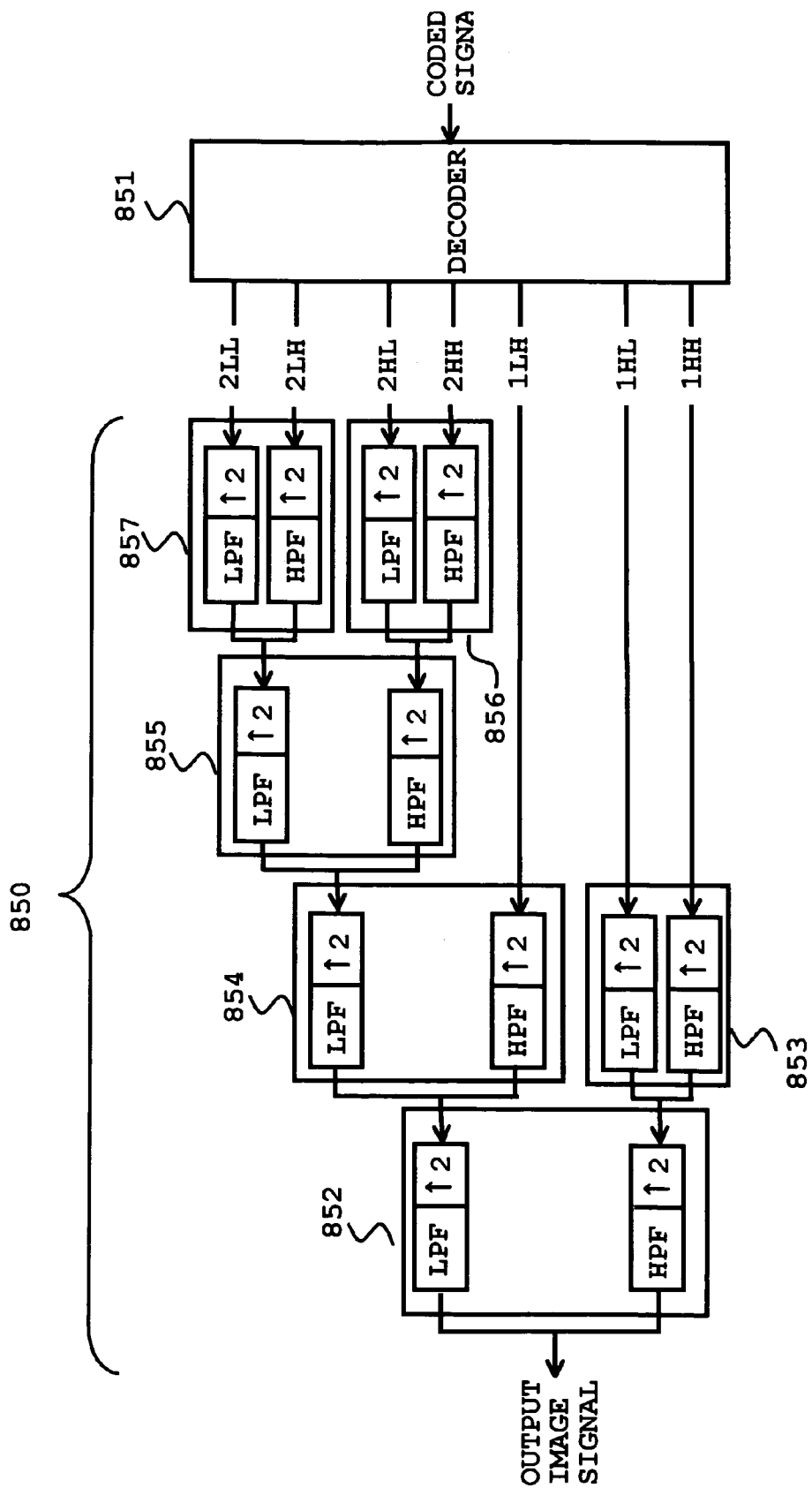

Referring to FIG. 23, an exemplary wavelet reverse conversion apparatus based on the wavelet conversion apparatus 1600 is explained. FIG. 23 shows a block diagram of a wavelet reverse conversion apparatus 1650 which reconstructs the signals coded by the wavelet conversion apparatus 1600. The wavelet reverse conversion apparatus 1650 of FIG. 23 includes decoding units 652a-652d, a wavelet coefficient synthesizing unit 651, and a wavelet reverse converting unit 650. Each of the decoding units 652a-652d is similar to the decoder 851 and is capable of performing the parallel processing. The wavelet coefficient synthesizing unit 651 synthesizes the signal regions which operation is the reverse equivalent of the analytic operation performed by the wavelet coefficient analyzing unit 601 of FIG. 18. The wavelet reverse converting unit 650 is similar to the wavelet reverse converter 850 of FIG. 26 and performs the two-layer wavelet reverse conversion.

The input signals a-d to the decoding units 652a-652d, respectively, are generated through the process, performed by the wavelet conversion apparatus 1600, for example, in which the two-layered wavelet conversion coefficients are divided into the four coefficient groups with the spatial regional division and then the coefficients in each of these coefficient groups are encoded. During this operation, encoding the coefficients of the four coefficient groups may be executed either in parallel with one encoding unit or in series with four encoding units. These four coefficient groups are respectively indicated by letters a, b, c, and d in FIG. 23.

The decoding units 652a-652d decode in parallel the coded signals a-d, respectively. The coded signals a-d are frequently combined into one signal and, if so, the combined signal have to be separated according to the coefficient group to obtain the coded signals a-d. This operation may be facilitated if each of the signals includes the spatial location information, as explained earlier. The spatial location information can also be used when the decoded wavelet coefficients are region-synthesized. This would be efficient in particular when the wavelet coefficient synthesizing unit 651 performs the region synthesis operation in accordance with the region analysis operation made relative to the wavelet coefficients which are generated with the unfixed region analysis. That is, the wavelet coefficient synthesizing unit 651 can perform the region synthesis operation in response to the region analysis operation in which the region analysis way is altered in accordance with the size of the input image signal, as explained with reference to FIGS. 21 and 22.

After decoding in parallel the coded signals a-d, respectively, the decoding units 652a-652d output the four coefficient groups each of which includes the region-analyzed wavelet coefficients. The wavelet coefficient synthesizing unit 651 performs the spatial region synthesis operation relative to the input four coefficient groups in accordance with the spatial location information attached to the coded signals and obtains a set of the subband-analyzed wavelet coefficients, as shown in FIG. 25. The wavelet reverse converting unit 650 receives the set of the subband-analyzed wavelet coefficients output from the wavelet coefficient synthesizing unit 651 and performs the two-layer wavelet reverse conversion relative to the received coefficients to output the original two-dimension signals such as an image signal.

In addition, if the additional coded signals which have been region-analyzed as belonging to the irregular regions, as explained above, are included in the input coded signals, additional decoding units for decoding these additional coded signals must be provided. In this case, the region synthesis operation which is the reverse equivalent of the region analysis operation is performed relative to the coefficients including the coefficients generated from these additional coded signals.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A sub-band coding apparatus which divides an input one-dimensional signal into a plurality of regions to obtain a plurality of regional signals and which performs a sub-band coding relative to each of the plurality of regional signals, the sub-band coding apparatus comprising:

a plurality of memories corresponding to the plurality of regions and respectively storing the plurality of regional signals as a central signal along with leading and trailing copy signals, said leading and trailing copy signals comprising copied portions from a leading or trailing portion of an adjacent stored one of the plurality of regional signals or inverted leading or trailing portions from the regional signal being stored; and a plurality of sub-band dividing filter banks corresponding to and connected to the plurality of memories and configured to perform sub-band division relative to each of the plurality of regional signals, wherein each of the plurality of sub-band dividing filter banks includes a sub-band dividing filter configured to divide an input signal received from a corresponding one of the plurality of memories into a plurality of sub-band signals and a down sampler configured to perform a down sampling relative to each of the plurality of sub-band signals divided respectively by the plurality of sub-band dividing filter banks.

2. The sub-band coding apparatus of claim 1, wherein at least one of the stored plurality of regional signals has a leading copy signal that corresponds to an inverted copied portion from a leading portion of the regional signal being stored and a trailing copy signal that corresponds to a copied portion from a leading portion of an adjacent stored one of the plurality of regional signals.

3. The sub-band coding apparatus of claim 1, wherein at least one of the stored plurality of regional signals has a leading copy signal that corresponds to a copied portion from a trailing portion of an adjacent stored one of the plurality of regional signals and a trailing copy signal that corresponds to a copied portion from a leading portion of an adjacent stored one of the plurality of regional signals.

4. The sub-band coding apparatus of claim 1, wherein at least one of the stored plurality of regional signals has a leading copy signal that corresponds to a copied portion from a trailing portion of an adjacent stored one of the plurality of regional signals and a trailing copy signal that corresponds an inverted copied portion from a trailing portion of the regional signal being stored.

5. A sub-band coding method which divides an input one-dimensional signal into a plurality of regions to obtain a plurality of regional signals and which performs a sub-band coding relative to each of the plurality of regional signals, the sub-band coding method comprising the steps of:

respectively storing the plurality of regional signals as a central signal along with leading and trailing copy signals in a plurality of memories corresponding to the plurality of regions, said leading and trailing copy signals comprising copied portions from a leading or trailing portion of an adjacent stored one of the plurality of regional signals or inverted leading or trailing portions from the regional signal being stored;

dividing the regional signals received from the plurality of memories into a plurality of sub-band signals using a sub-band dividing filter in each of a plurality of sub-band dividing filter banks; and performing a down sampling with a down sampler relative to each of the plurality of sub-band signals divided respectively by the plurality of sub-band dividing filter banks.

6. The sub-band coding method of claim 5, wherein at least one of the stored plurality of regional signals has a leading copy signal that corresponds to an inverted copied portion from a leading portion of the regional signal being stored and a trailing copy signal that corresponds to a copied portion from a leading portion of an adjacent stored one of the plurality of regional signals.

7. The sub-band coding method of claim 5, wherein at least one of the stored plurality of regional signals has a leading copy signal that corresponds to a copied portion from a trailing portion of an adjacent stored one of the plurality of regional signals and a trailing copy signal that corresponds to a copied portion from a leading portion of an adjacent stored one of the plurality of regional signals.

8. The sub-band coding method of claim 5, wherein at least one of the stored plurality of regional signals has a leading copy signal that corresponds to a copied portion from a trailing portion of an adjacent stored one of the plurality of regional signals and a trailing copy signal that corresponds an inverted copied portion from a trailing portion of the regional signal being stored.

\* \* \* \* \*